(12) United States Patent
Yang et al.

(10) Patent No.: US 10,445,568 B2
(45) Date of Patent: *Oct. 15, 2019

(54) TWO-DIMENSIONAL SYMBOL FOR FACILITATING MACHINE LEARNING OF COMBINED MEANING OF MULTIPLE IDEOGRAMS CONTAINED THEREIN

(71) Applicant: GYRFALCON TECHNOLOGY INC., Milpitas, CA (US)

(72) Inventors: Lin Yang, Milpitas, CA (US); Patrick Z. Dong, San Jose, CA (US); Baohua Sun, Fremont, CA (US)

(73) Assignee: Gyrfalcon Technology Inc. CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,920

(22) Filed: Apr. 4, 2019

(65) Prior Publication Data

US 2019/0228219 A1    Jul. 25, 2019

Related U.S. Application Data

(63) Continuation of application No. 15/861,596, filed on Jan. 3, 2018, now Pat. No. 10,275,646, which is a
(Continued)

(51) Int. Cl.
*G06K 9/00* (2006.01)
*G06T 7/246* (2017.01)
(Continued)

(52) U.S. Cl.
CPC ....... *G06K 9/00375* (2013.01); *G06K 9/4628* (2013.01); *G06K 9/66* (2013.01);
(Continued)

(58) Field of Classification Search
CPC .............. G06F 17/274; G06F 17/2765; G06F 17/2863; G06F 17/2775; G06F 17/2785;
(Continued)

(56) References Cited

U.S. PATENT DOCUMENTS 5,140,670 A    8/1992   Chua et al.
5,355,528 A    10/1994  Roska et al.
(Continued)

OTHER PUBLICATIONS

Shur et al. "A Corpus of Natural Language for Visual Reasoning", 2017, Facebook AI Research, Menlo Park, CA.
(Continued)

*Primary Examiner* — Michael S Osinski
(74) *Attorney, Agent, or Firm* — RC Patent Services

(57) ABSTRACT

Two-dimensional symbols with each containing multiple ideograms for facilitating machine learning are disclosed. Two-dimensional symbol comprises a matrix of N×N pixels of data representing a "super-character". The matrix is divided into M×M sub-matrices with each of the sub-matrices containing (N/M)×(N/M) pixels. N and M are positive integers or whole numbers, and N is preferably a multiple of M. Each of the sub-matrices represents one ideogram defined in an ideogram collection set. "Super-character" represents at least one meaning each formed with a specific combination of a plurality of ideograms. Ideogram collection set includes, but is not limited to, pictograms, logosyllabic characters, Japanese characters, Korean characters, punctuation marks, numerals, special characters. Logosyllabic characters may contain one or more of Chinese characters, Japanese characters, Korean characters. Features of each ideogram can be represented by more than one layer of two-dimensional symbol.

18 Claims, 42 Drawing Sheets

Related U.S. Application Data continuation-in-part of application No. 15/709,220, filed on Sep. 19, 2017, now Pat. No. 10,083,171, which is a continuation-in-part of application No. 15/694,711, filed on Sep. 1, 2017, now Pat. No. 10,102,453, which is a continuation-in-part of application No. 15/683,723, filed on Aug. 22, 2017, now abandoned.

(60) Provisional application No. 62/541,081, filed on Aug. 3, 2017.

(51) Int. Cl.
| | |
|---|---|
| G06T 1/00 | (2006.01) |
| G06K 9/72 | (2006.01) |
| G06K 9/46 | (2006.01) |
| G06N 3/08 | (2006.01) |
| G06K 9/66 | (2006.01) |

(52) U.S. Cl.
CPC .............. *G06K 9/72* (2013.01); *G06N 3/08* (2013.01); *G06T 1/005* (2013.01); *G06T 7/246* (2017.01); *G06T 2207/10016* (2013.01); *G06T 2207/20081* (2013.01); *G06T 2207/20084* (2013.01); *G06T 2207/30196* (2013.01); *G06T 2207/30232* (2013.01)

(58) Field of Classification Search
CPC .... G06F 17/28; G06F 17/30705; G06F 17/21; G06F 17/2872; G06F 17/2881; G06F 17/30253; G06F 17/30256; G06F 17/30684; G06K 9/18; G06K 9/5158; G06K 9/55; G06K 9/00872; G06K 9/4676; G06N 3/0481; G06N 3/08
See application file for complete search history.

(56) References Cited

U.S. PATENT DOCUMENTS

| | | | |
|---|---|---|---|
| 5,835,924 | A | 11/1998 | Maruyama et al. |
| 6,047,276 | A | 4/2000 | Manganaro et al. |
| 6,519,363 | B1 | 2/2003 | Su et al. |
| 6,665,436 | B2 | 12/2003 | Su et al. |
| 6,754,645 | B2 | 6/2004 | Shi et al. |
| 6,795,579 | B2 | 9/2004 | Tang et al. |
| 6,941,513 | B2 | 9/2005 | Meystel et al. |
| 7,130,487 | B1 | 10/2006 | Imagawa et al. |
| 7,165,019 | B1 | 1/2007 | Lee et al. |
| 7,478,033 | B2 | 1/2009 | Wu et al. |
| 7,565,624 | B2 | 7/2009 | Fux et al. |
| 8,024,319 | B2 | 9/2011 | Gao et al. |
| 8,321,222 | B2 | 11/2012 | Pollet et al. |
| 8,726,148 | B1 | 5/2014 | Battilana |
| 9,026,432 | B2 | 5/2015 | Zangvil |
| 9,165,181 | B2 | 10/2015 | Maeda et al. |
| 9,245,205 | B1* | 1/2016 | Soldevila ............ G06K 9/4642 |
| 9,330,086 | B2 | 5/2016 | Zhao et al. |
| 9,418,319 | B2 | 8/2016 | Shen et al. |
| 9,460,344 | B2 | 10/2016 | Wang et al. |
| 10,037,458 | B1 | 7/2018 | Mahmoud et al. |
| 10,331,967 | B1* | 6/2019 | Yang .................... G06K 9/4642 |
| 2001/0014176 | A1 | 8/2001 | Kamada et al. |
| 2003/0108239 | A1 | 6/2003 | Su et al. |
| 2003/0110035 | A1 | 6/2003 | Thong et al. |
| 2004/0243389 | A1 | 12/2004 | Thomas et al. |
| 2005/0209844 | A1 | 9/2005 | Wu et al. |
| 2008/0130996 | A1 | 6/2008 | Sternby |
| 2009/0048841 | A1 | 2/2009 | Pollet et al. |
| 2010/0158394 | A1 | 6/2010 | Chang et al. |
| 2010/0286979 | A1 | 11/2010 | Zangvil et al. |
| 2011/0015920 | A1 | 1/2011 | How |
| 2012/0263346 | A1 | 10/2012 | Datta et al. |
| 2013/0002553 | A1 | 1/2013 | Colley |
| 2013/0060786 | A1 | 3/2013 | Serrano et al. |
| 2013/0182898 | A1 | 7/2013 | Maeda et al. |
| 2014/0040270 | A1 | 2/2014 | O'Sullivan |
| 2014/0062862 | A1 | 3/2014 | Yamashita |
| 2014/0355835 | A1 | 12/2014 | Rodriguez-Serrano et al. |
| 2015/0036920 | A1 | 2/2015 | Wu et al. |
| 2015/0104149 | A1 | 4/2015 | Sim et al. |
| 2015/0186504 | A1* | 7/2015 | Gorman ............ G06F 16/24522 707/752 |
| 2015/0193431 | A1 | 7/2015 | Stoytchev et al. |
| 2015/0339525 | A1* | 11/2015 | Marcelli ............ G06K 9/00416 382/161 |
| 2016/0124630 | A1 | 5/2016 | Qian et al. |
| 2016/0162467 | A1* | 6/2016 | Munro .................. G06F 17/277 704/9 |
| 2016/0163035 | A1* | 6/2016 | Chang .................. G06K 9/4628 382/149 |
| 2016/0217319 | A1 | 7/2016 | Bhanu et al. |
| 2016/0307469 | A1 | 10/2016 | Zhou et al. |
| 2016/0358036 | A1 | 12/2016 | Yang et al. |
| 2017/0004184 | A1 | 1/2017 | Jain et al. |
| 2017/0011279 | A1 | 1/2017 | Soldevila et al. |
| 2017/0032035 | A1 | 2/2017 | Gao et al. |
| 2017/0177710 | A1 | 6/2017 | Burlik |
| 2018/0060302 | A1 | 3/2018 | Liang et al. |
| 2018/0101520 | A1 | 4/2018 | Fuchizaki et al. |
| 2018/0147062 | A1 | 5/2018 | Ay et al. |
| 2018/0150457 | A9 | 5/2018 | Stoytchev et al. |
| 2018/0150956 | A1 | 5/2018 | Kao et al. |
| 2018/0341630 | A1 | 11/2018 | DeVries |
| 2019/0043149 | A1 | 2/2019 | D'Ercoli et al. |

OTHER PUBLICATIONS

Yoon Kim, "Convolutional Neural Networks for Sentence Classification", Sep. 2014, New York University.

Rastegari et al. "XNOR-Net: ImageNet Classification Using Binary Convolutional Neural Networks", Aug. 2, 2016, Allen Institute for AI, Univ. of Washington.

Gysel et al. "Hardware-Oriented Approximation of Convolutional Neural Networks", Oct. 20, 2016, Department of Electrical and Computer Engineering, University of California, Davis, CA.

L. Chua et al. "Cellular Neural Networks: Theory", IEEE Transactions on Circuits and Systems, vol. 35, No. 10, pp. 1257-1271 Oct. 1988.

L. Chua et al. "Cellular Neural Networks: Applications", IEEE Transactions on Circuits and Systems, vol. 35, No. 10, pp. 1273-1290 Oct. 1988.

Angela Slavova "Applications of Some Mathematical Methods in the Analysis of Cellular Neural Networks", Journal of computational and Applied Mathematics 114 (2000) 387-404.

Lee et al. "Color Image Processing in a Cellular Neural-Network Environment" IEEE Transaction on Neural Networks, vol. 7, No. 5. pp. 1086-1098 Sep. 1996.

L. Yang et al. "VLSI Implementation of Cellular Neural Networks", IEEE 1990 CH2868-8/90 pp. 2425-2427.

Korekado et al. "A VLSI Convolutional Neural Network for Image Recognition Using Merged/Mixed Analog-Digital Architecture", 2003.

Duan et al. "Memristor-Based Cellular Nonlinear/Neural Network: Design, Analysis, and Applications", IEEE Transactions on Neural Networks and Learning Systems 2014.

USPTO Restriction Requirement for U.S. Appl. No. 15/861,596 (Parent App.) dated Jan. 4, 2019.

USPTO Notice of Allowance for U.S. Appl. No. 15/861,596 (Parent App.) dated Mar. 1, 2019.

USPTO Office Action for U.S. Appl. No. 15/683,723 (Parent App.) dated Jan. 17, 2019.

Liu et al. "An Approach to Machine Learning of Chine Pinyin-To-Character Conversion for Small-Memory Application"; Proceedings of the First International Conference on Machine Learning and Cybermetices, Beijing, Nov. 4-5, 2002.

Shamsher et al. "OCR for Printed Urdu Script Using Feed Forward Neural network"; World Academy of Science, Engineering and Technology 34 2007 (Year: 2007).

(56) References Cited

OTHER PUBLICATIONS

"Text feature extraction based on deep learning: a review", Hong Liang, Xiao Sun, Yunlei Sun and Yuan Gao; EURASIP Journal on Wireless Communications & Networking: Dec. 15, 2017, vol. Issue 1, pp. 1-12.
"Using convolution control block for Chinese sentiment analysis", Zheng Xiao, Xiong Li, Le Wang, Qiuwei Yang, Jiayi Du, Arun Kumar Sangaiah; Journal of Parallel & Distrubuted Computing, Jun. 2018, vol. 118, pp. 18-26.
"A survey of deep neural network architectures and their applications", Weibo Liu, Zidong Wang, Xiaohui Liu, Nianyin Zeng, Yuong Liu, Fuad E. Aisaadi; in Neurocomputing Apr. 19, 2017 234: pp. 11-26.
"Investigatation on deep learning for off-line handwritten Arabic character recognition"; Bonfenar et a.; in Cognitive Systems Research Aug. 2018 50: pp. 180-195.
"Chinese Character CAPTCHA Recognition and performance estimation via deep neural network", Lin et. al. ; Neurocomputing; May 2018, vol. 288, p. 11-19.
Building fast and compact convolutional neural networks for office handwritten Chinese character recognition, Xiao et al.; in Pattern Recognition Dec. 2017, pp. 72-81.
"Optical Character Recognition with Neural Network", Sarita; International Journal of Recent Research Aspects ISSN: 2349-7688, vol. 2 Issue 3, Sep. 2015, pp. 4-8.
"Improving handwritten Chinese text recognition using neural network language models and convolutional neural network shape models", Yi-Chao Wu; Fei Yin, Cheng-Lin Liu; in Pattern Recognition May 2017 65:pp. 251-264.
USPTO Notice of Allowance U.S. Appl. No. 15/709,220 dated Jul. 17, 2018.
USPTO Office Action U.S. Appl. No. 15/694,711 dated Aug. 3, 2018.

\* cited by examiner

326

327

328

ZxZ pixel locations (Z/2)x(Z/2) pixel locations

TWO-DIMENSIONAL SYMBOL FOR FACILITATING MACHINE LEARNING OF COMBINED MEANING OF MULTIPLE IDEOGRAMS CONTAINED THEREIN

CROSS-REFERENCE TO RELATED APPLICATIONS

This application is a continuation application to a co-pending U.S. patent application Ser. No. 15/861,596, filed on Jan. 3, 2018, which is a continuation-in-part (CIP) to a U.S. patent application Ser. No. 15/709,220 for "Natural Language Processing Using A CNN Based Integrated Circuit" filed on Sep. 19, 2017 (now U.S. Pat. No. 10,083,171 issued Sep. 25, 2018), which is a CIP to a U.S. patent application Ser. No. 15/694,711 for "Natural Language Processing Via A Two-dimensional Symbol Having Multiple Ideograms Contained Therein" filed on Sep. 1, 2017 (now U.S. Pat. No. 10,102,453 issued Oct. 16, 2018), which is a CIP to a co-pending U.S. patent application Ser. No. 15/683,723 for "Two-dimensional Symbols For Facilitating Machine Learning Of Combined Meaning Of Multiple Ideograms Contained Therein" filed on Aug. 22, 2017, which claims priority from a U.S. Provisional Patent Application Ser. No. 62/541,081, entitled "Two-dimensional Symbol For Facilitating Machine Learning Of Natural Languages Having Logosyllabic Characters" filed on Aug. 3, 2017. All of which are hereby incorporated by reference in their entirety for all purposes.

FIELD

The invention generally relates to the field of machine learning and more particularly to natural language processing using a Cellular Neural Networks or Cellular Nonlinear Networks (CNN) based Integrated Circuit.

BACKGROUND

An ideogram is a graphic symbol that represents an idea or concept. Some ideograms are comprehensible only by familiarity with prior convention; others convey their meaning through pictorial resemblance to a physical object.

Machine learning is an application of artificial intelligence. In machine learning, a computer or computing device is programmed to think like human beings so that the computer may be taught to learn on its own. The development of neural networks has been key to teaching computers to think and understand the world in the way human beings do.

The task of recognizing movements of a person in a video and/or a series of images has a lot of practical usage, for example, surveillance camera for detecting suspicious activities for security reasons, video game for detecting player's movements to understand player's command, or, autonomous car for detecting movements of pediatricians and other vehicles, etc.

Prior art approaches to recognize motions of an object in an video generally use software algorithms that solve time-series related problems. Such approaches are hard to be implemented in a semiconductor chip. Therefore, prior approaches cannot support motion recognitions in a local device, or edge computing. Date must be sent to a remote server for complicated computations. The computed results are then sent back to the local device. Such approaches suffer time delay and data security issues.

It would therefore be desirable to have improve methods of recognizing motions of an object in a video clips or an image sequence that can be achieved in a local device.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Methods of recognizing motions of an object in a video clip or an image sequence are disclosed. According to one aspect, a plurality of frames are selected out of a video clip or an image sequence of interest. A text category is associated with each frame by applying an image classification technique with a trained deep-learning model for a set of categories containing various poses of an object within each frame. A "super-character" is formed by embedding respective text categories of the frames as corresponding ideograms in a 2-D symbol having multiple ideograms contained therein. Particular motion of the object is recognized by obtaining the meaning of the "super-character" with image classification of the 2-D symbol via a trained convolutional neural networks model for various motions of the object derived from specific sequential combinations of text categories. Ideograms may contain imagery data instead of text categories, e.g., detailed images or reduced-size images.

According to another aspect of the invention, 2-D symbol comprises a matrix of N×N pixels of K-bit data representing a "super-character". The matrix is divided into M×M sub-matrices with each sub-matrix containing (N/M)×(N/M) pixels. K, N and M are positive integers, and N is preferably a multiple of M. Each sub-matrix represents one ideogram defined in an ideogram collection set. "Super-character" represents a meaning formed from a specific combination of a plurality of ideograms. The meaning of the "super-character" is learned by classifying the 2-D symbol via a trained convolutional neural networks model having bi-valued 3×3 filter kernels in a Cellular Neural Networks or Cellular Nonlinear Networks (CNN) based integrated circuit.

According to yet another aspect, the trained convolutional neural networks model is achieved with the following operations: (a) obtaining a convolutional neural networks model by training the convolutional neural networks model based on image classification of a labeled dataset, which contains a sufficiently large number of multi-layer 2-D symbols, the convolutional neural networks model including multiple ordered filter groups, each filter in the multiple ordered filter groups containing a standard 3×3 filter kernel; (b) modifying the convolutional neural networks model by converting the respective standard 3×3 filter kernels to corresponding bi-valued 3×3 filter kernels of a currently-processed filter group in the multiple ordered filter groups based on a set of kernel conversion schemes; (c) retraining the modified convolutional neural networks model until a desired convergence criterion is met; and (d) repeating (b)-(c) for another filter group until all multiple ordered filter groups have been converted to the bi-valued 3×3 filter kernels.

Ideogram collection set includes, but is not limited to, pictograms, icons, logos, logosyllabic characters, punctuation marks, numerals, special characters.

One of the objectives, features and advantages of the invention is to use a CNN based integrated circuit having dedicated built-in logics for performing simultaneous convolutions such that the image processing technique (i.e., convolutional neural networks) for motion recognition is conducted in hardware.

Other objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-24B. However, those skilled in the art will readily appreciate that the detailed description given herein with respect to these figures is for explanatory purposes as the invention extends beyond these limited embodiments.

Figure 1:
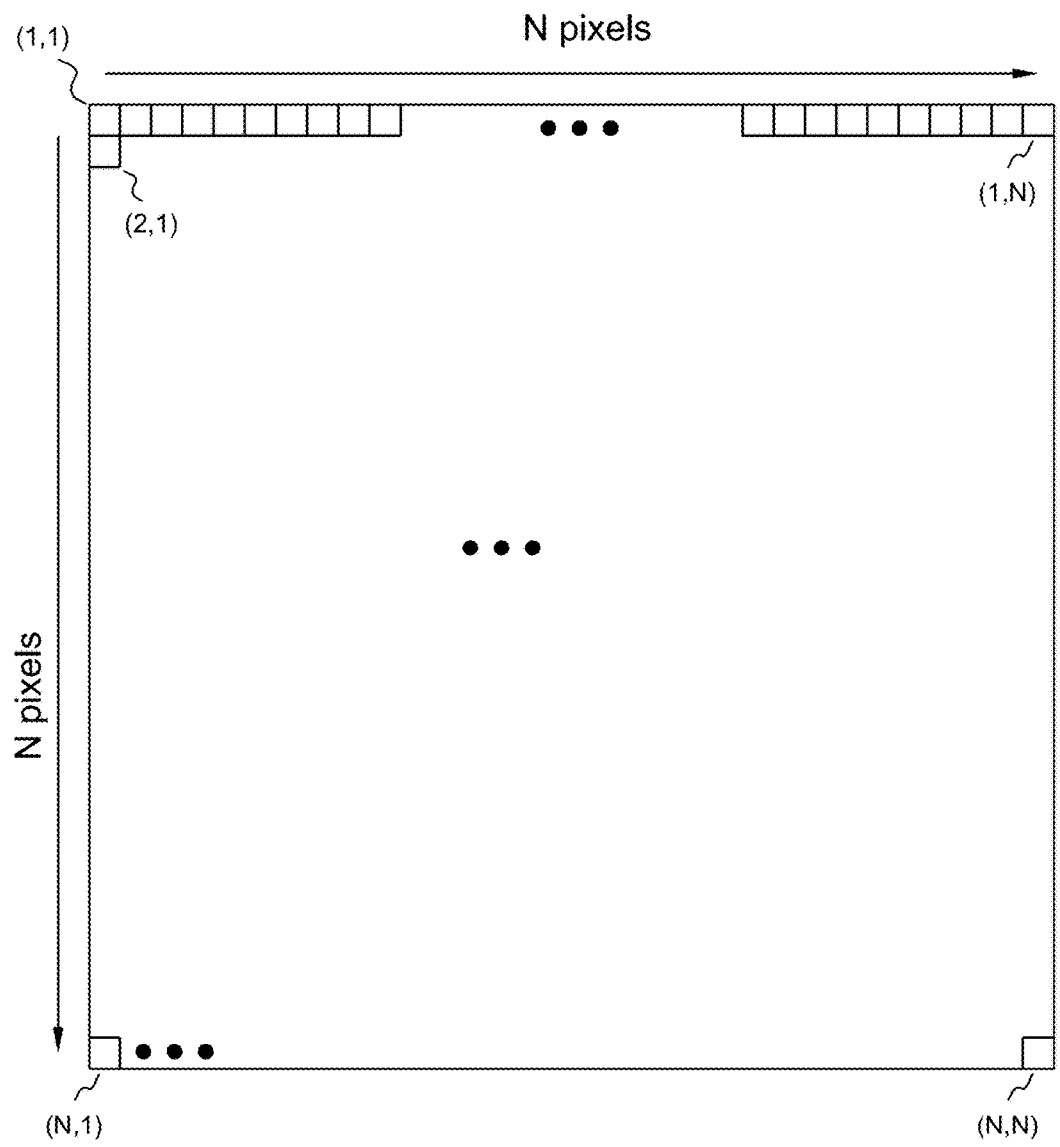
FIG. 1 is a diagram illustrating an example two-dimensional symbol comprising a matrix of N×N pixels of data that represents a "super-character" for facilitating machine learning of a combined meaning of multiple ideograms contained therein according to an embodiment of the invention.

Referring first to FIG. 1, it is shown a diagram showing an example two-dimensional symbol 100 for facilitating machine learning of a combined meaning of multiple ideograms contained therein. The two-dimensional symbol 100 comprises a matrix of N×N pixels (i.e., N columns by N rows) of data containing a "super-character". Pixels are ordered with row first and column second as follows: (1,1), (1,2), (1,3), . . . (1,N), (2,1), . . . , (N,1), . . . (N,N). N is a positive integer, for example in one embodiment, N is equal to 224.

"Super-character" represents at least one meaning each formed with a specific combination of a plurality of ideograms. Since an ideogram can be represented in a certain size matrix of pixels, two-dimensional symbol 100 is divided into M×M sub-matrices. Each of the sub-matrices represents one ideogram, which is defined in an ideogram collection set by humans. "Super-character" contains a minimum of two and a maximum of M×M ideograms. Both N and M are positive integers, and N is preferably a multiple of M.

Figure 2A:
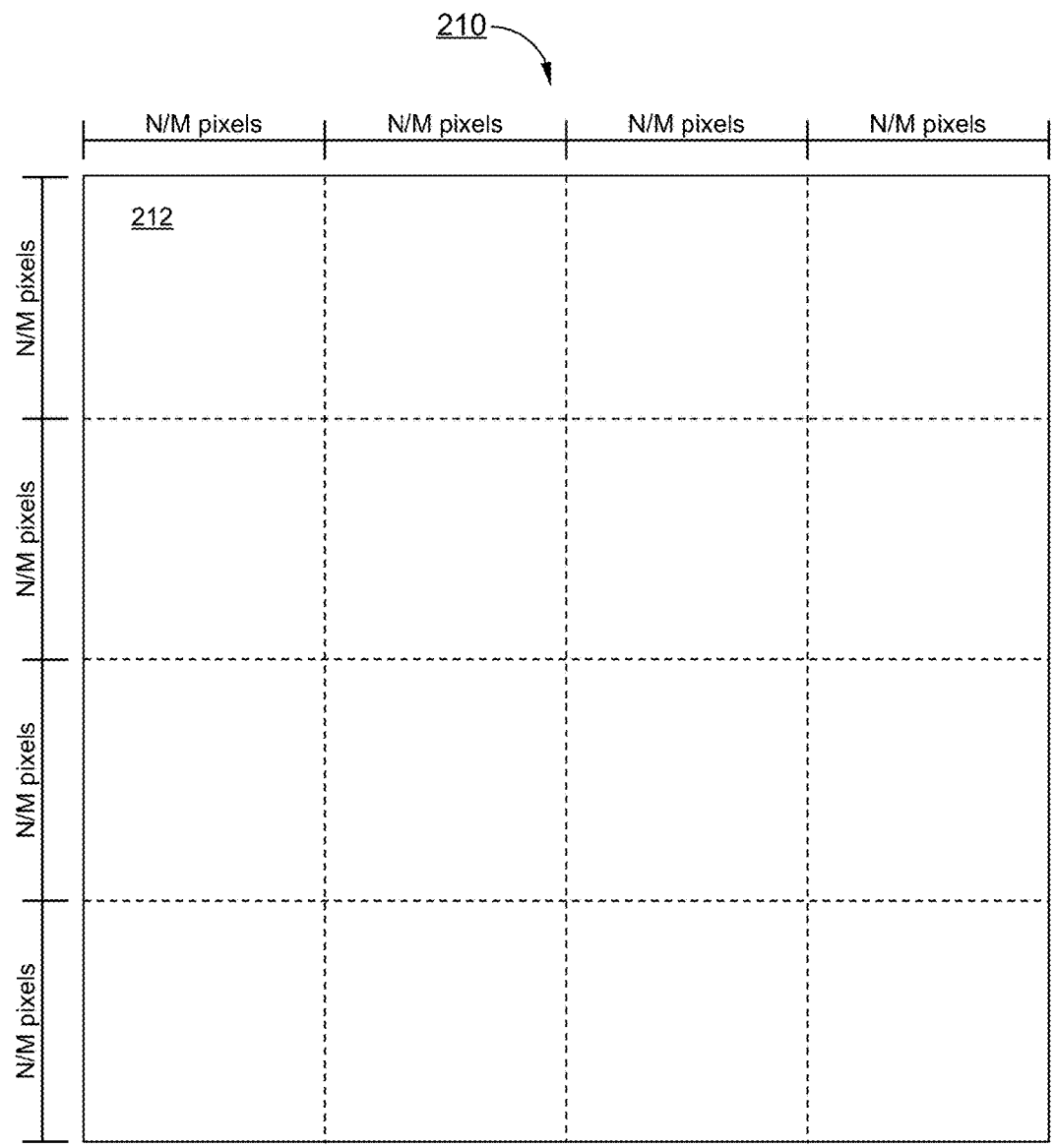
FIGS. 2A-2B are diagrams showing example partition schemes for dividing the two-dimensional symbol of FIG. 1 in accordance with embodiments of the invention.

Shown in FIG. 2A, it is a first example partition scheme 210 of dividing a two-dimension symbol into M×M sub-matrices 212. M is equal to 4 in the first example partition scheme. Each of the M×M sub-matrices 212 contains (N/M)×(N/M) pixels. When N is equal to 224, each sub-matrix contains 56×56 pixels and there are 16 sub-matrices.

Figure 2B:
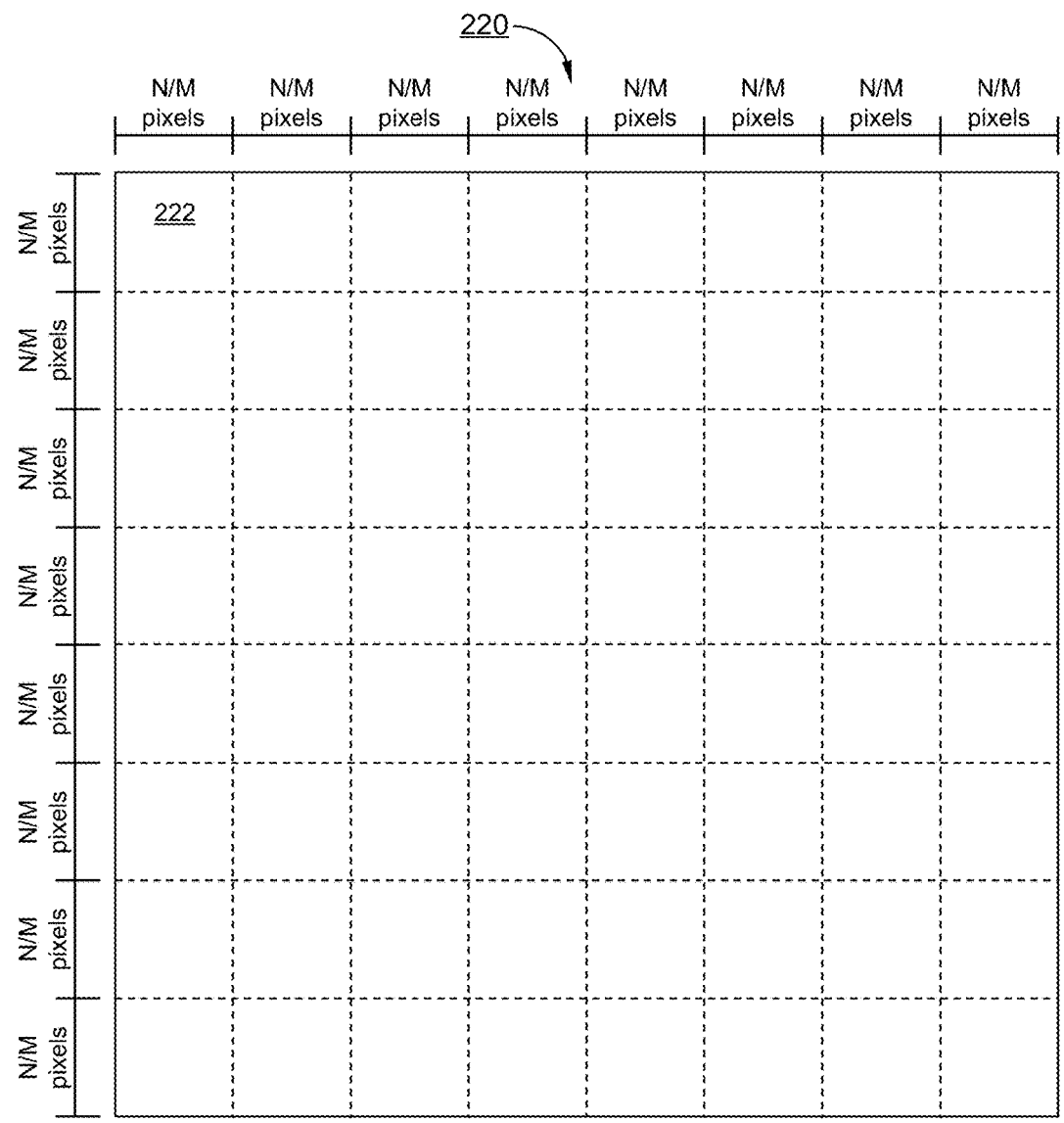

A second example partition scheme 220 of dividing a two-dimension symbol into M×M sub-matrices 222 is shown in FIG. 2B. M is equal to 8 in the second example partition scheme. Each of the M×M sub-matrices 222 contains (N/M)×(N/M) pixels. When N is equal to 224, each sub-matrix contains 28×28 pixels and there are 64 sub-matrices.

Figure 3A:
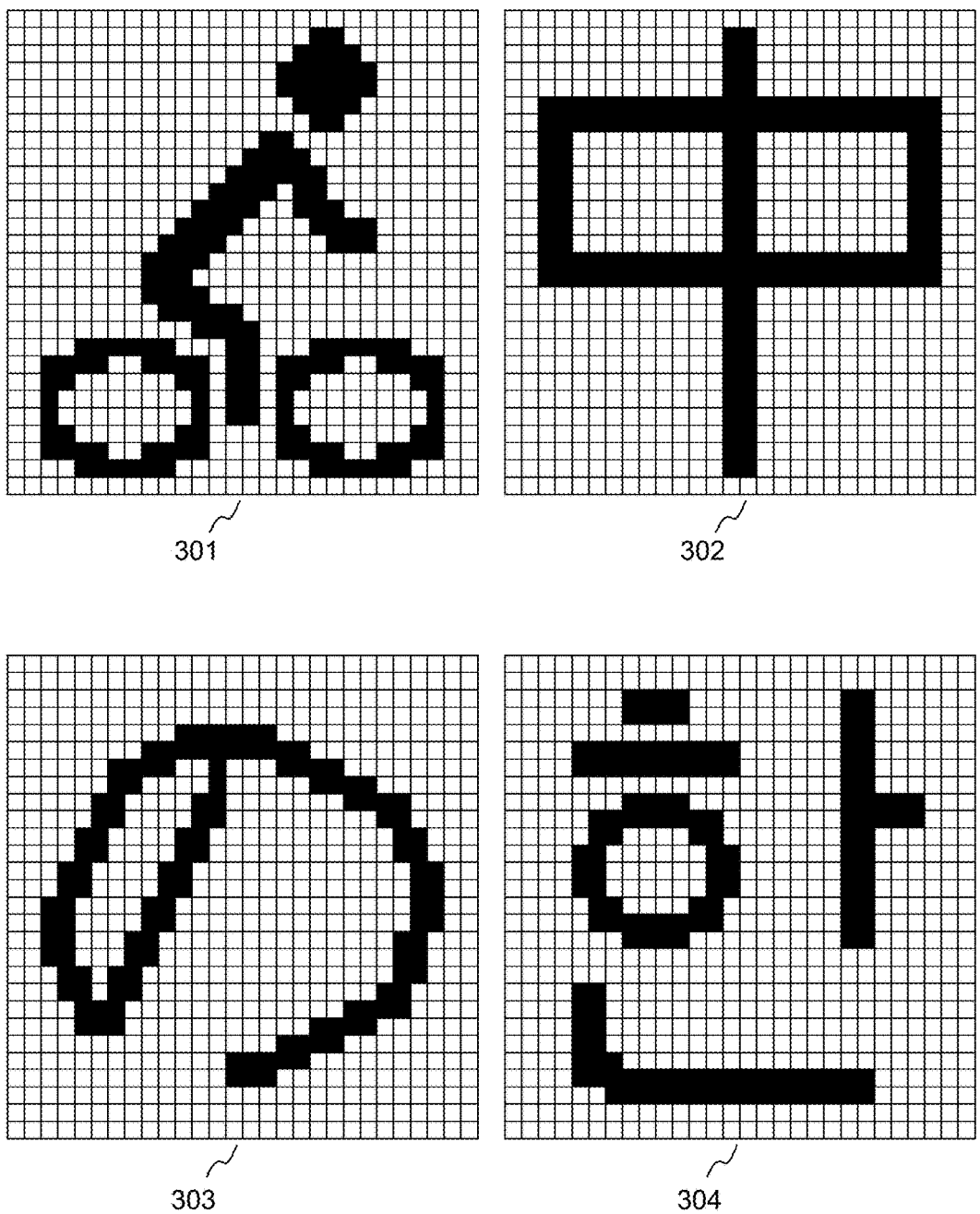
FIGS. 3A-3B show example ideograms in accordance with an embodiment of the invention.

FIG. 3A shows example ideograms 301-304 that can be represented in a sub-matrix 222 (i.e., 28×28 pixels). For those having ordinary skill in the art would understand that the sub-matrix 212 having 56×56 pixels can also be adapted for representing these ideograms. The first example ideogram 301 is a pictogram representing an icon of a person riding a bicycle. The second example ideogram 302 is a logosyllabic script or character representing an example Chinese character. The third example ideogram 303 is a logosyllabic script or character representing an example Japanese character and the fourth example ideogram 304 is a logosyllabic script or character representing an example Korean character. Additionally, ideogram can also be punctuation marks, numerals or special characters. In another embodiment, pictogram may contain an icon of other images. Icon used herein in this document is defined by humans as a sign or representation that stands for its object by virtue of a resemblance or analogy to it.

Figure 3B:
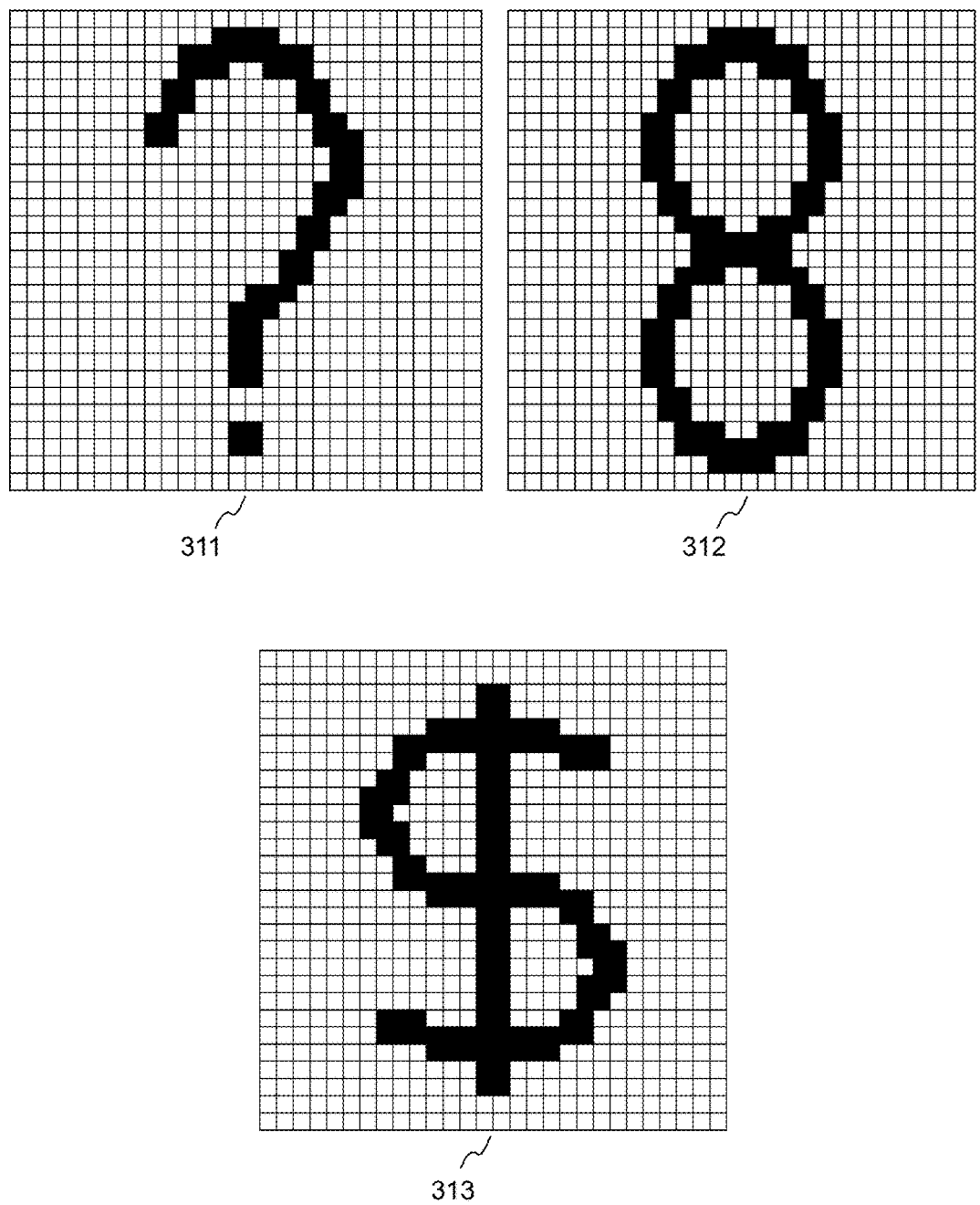
Figure 3C:
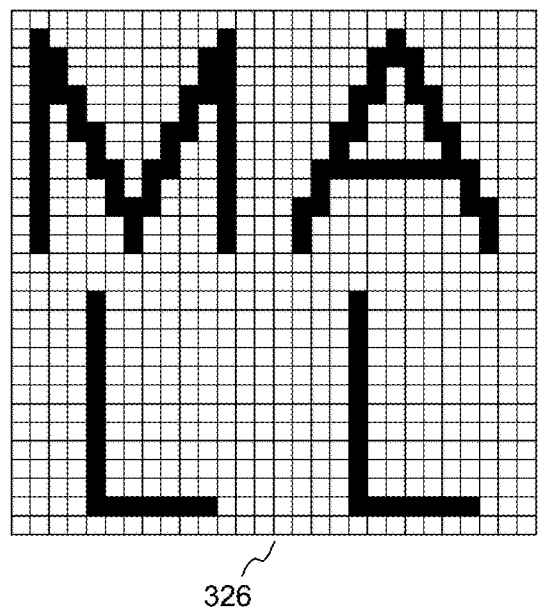
FIG. 3C shows example pictograms containing western languages based on Latin letters in accordance with an embodiment of the invention.
Figure 3C:
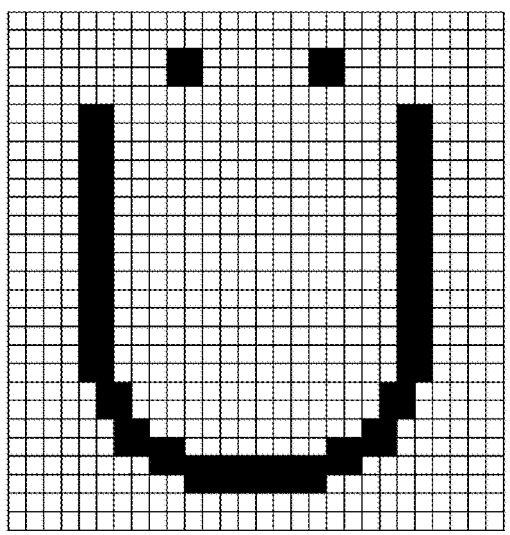
Figure 3C:
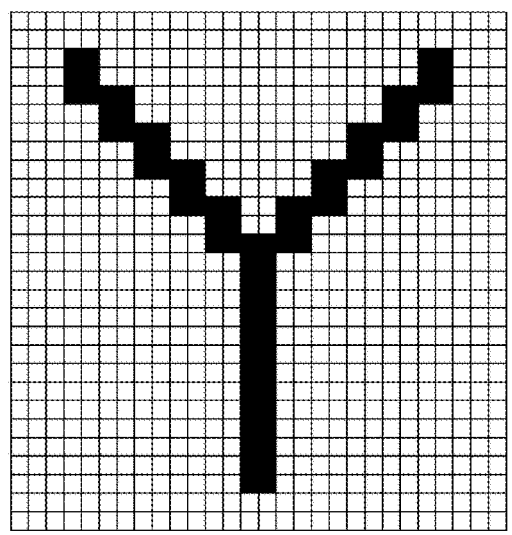

FIG. 3B shows several example ideograms representing: a punctuation mark 311, a numeral 312 and a special character 313. Furthermore, pictogram may contain one or more words of western languages based on Latin letters, for example, English, Spanish, French, German, etc. FIG. 3C shows example pictograms containing western languages based on Latin letters. The first example pictogram 326 shows an English word "MALL". The second example pictogram 327 shows a Latin letter "Ü" and the third example pictogram 328 shows English alphabet "Y". Ideogram can be any one of them, as long as the ideogram is defined in the ideogram collection set by humans.

Only limited number of features of an ideogram can be represented using one single two-dimensional symbol. For example, features of an ideogram can be black and white when data of each pixel contains one-bit. Feature such as grayscale shades can be shown with data in each pixel containing more than one-bit.

Additional features are represented using two or more layers of an ideogram. In one embodiment, three respective basic color layers of an ideogram (i.e., red, green and blue) are used collectively for representing different colors in the ideogram. Data in each pixel of the two-dimensional symbol contains a K-bit binary number. K is a positive integer. In one embodiment, K is 5.

Figure 3D:
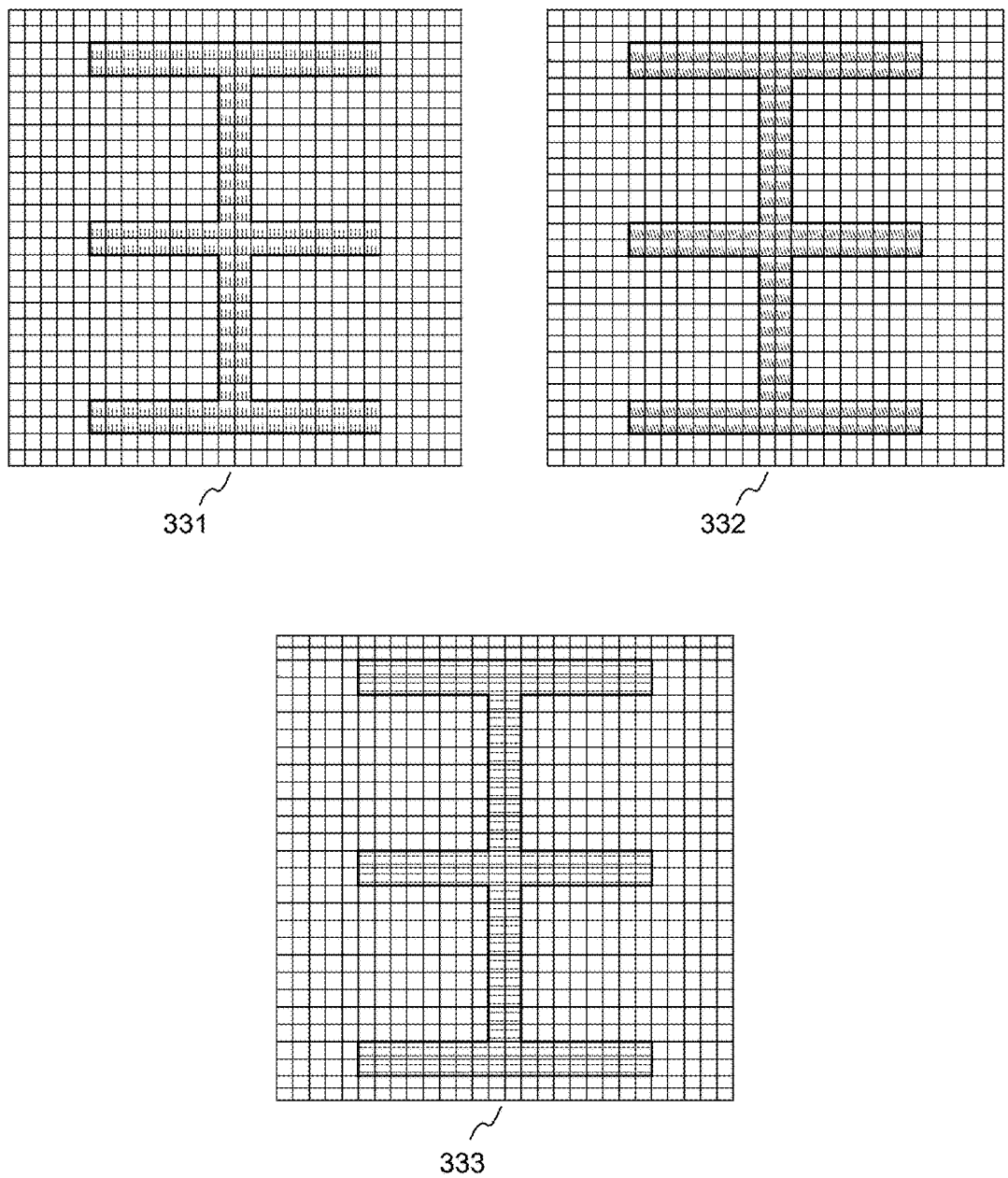
FIG. 3D shows three respective basic color layers of an example ideogram in accordance with an embodiment of the invention.

FIG. 3D shows three respective basic color layers of an example ideogram. Ideogram of a Chinese character are shown with red 331, green 332 and blue 333. With different combined intensity of the three basic colors, a number of color shades can be represented. Multiple color shades may exist within an ideogram.

Figure 3E:
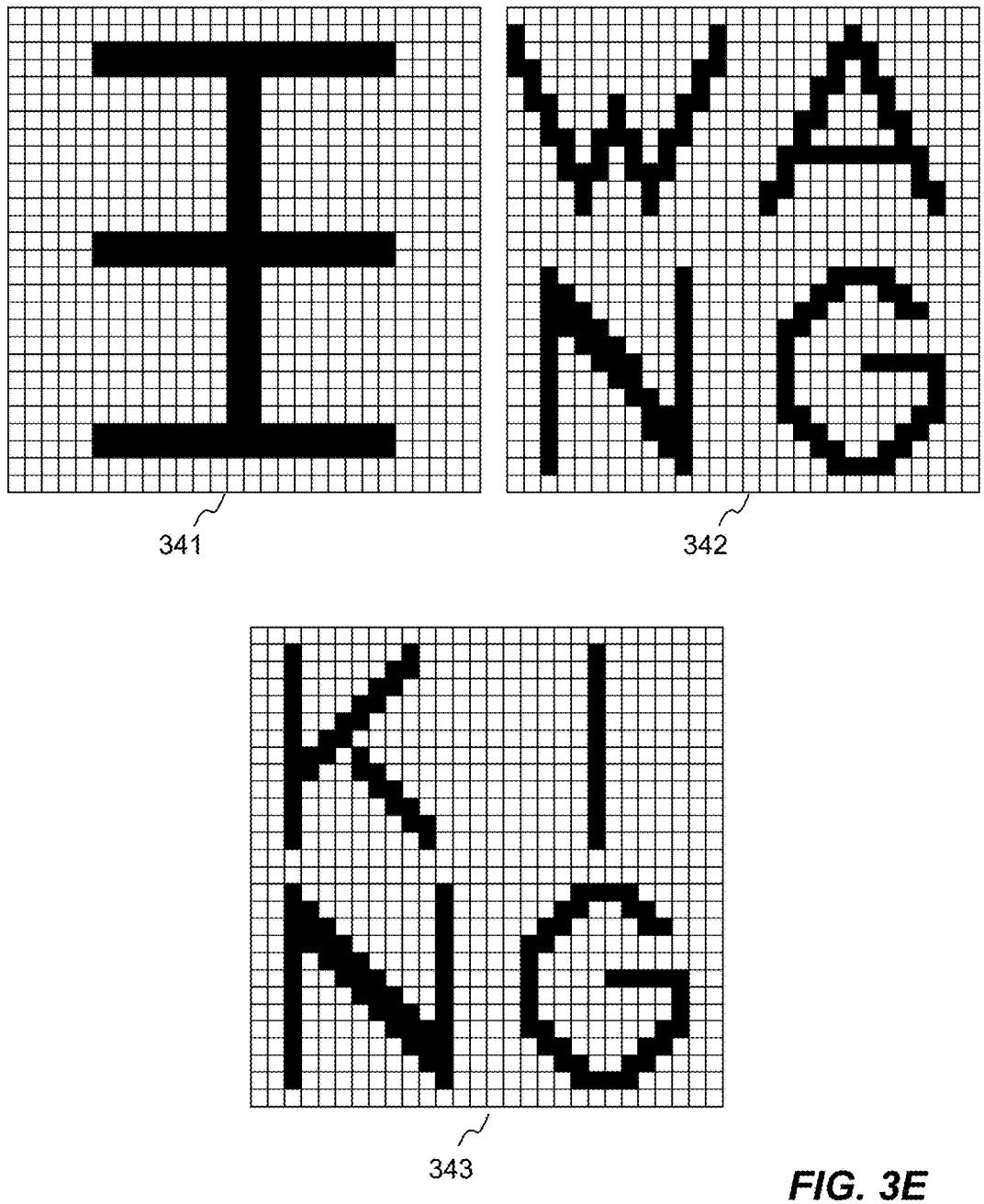
FIG. 3E shows three related layers of an example ideogram for dictionary-like definition in accordance with an embodiment of the invention.

In another embodiment, three related ideograms are used for representing other features such as a dictionary-like definition of a Chinese character shown in FIG. 3E. There are three layers for the example ideogram in FIG. 3E: the first layer 341 showing a Chinese logosyllabic character, the second layer 342 showing the Chinese "pinyin" pronunciation as "wang", and the third layer 343 showing the meaning in English as "king".

Ideogram collection set includes, but is not limited to, pictograms, icons, logos, logosyllabic characters, punctuation marks, numerals, special characters. Logosyllabic characters may contain one or more of Chinese characters, Japanese characters, Korean characters, etc.

In order to systematically include Chinese characters, a standard Chinese character set (e.g., GB18030) may be used as a start for the ideogram collection set. For including Japanese and Korean characters, CJK Unified Ideographs may be used. Other character sets for logosyllabic characters or scripts may also be used.

A specific combined meaning of ideograms contained in a "super-character" is a result of using image processing techniques in a Cellular Neural Networks or Cellular Non-linear Networks (CNN) based computing system. Image processing techniques include, but are not limited to, convolutional neural networks, recurrent neural networks, etc.

"Super-character" represents a combined meaning of at least two ideograms out of a maximum of M×M ideograms. In one embodiment, a pictogram and a Chinese character are combined to form a specific meaning. In another embodiment, two or more Chinese characters are combined to form a meaning. In yet another embodiment, one Chinese character and a Korean character are combined to form a meaning. There is no restriction as to which two or more ideograms to be combined.

Ideograms contained in a two-dimensional symbol for forming "super-character" can be arbitrarily located. No specific order within the two-dimensional symbol is required. Ideograms can be arranged left to right, right to left, top to bottom, bottom to top, or diagonally.

Using written Chinese language as an example, combining two or more Chinese characters may result in a "super-character" including, but not limited to, phrases, idioms, proverbs, poems, sentences, paragraphs, written passages, articles (i.e., written works). In certain instances, the "super-character" may be in a particular area of the written Chinese language. The particular area may include, but is not limited to, certain folk stories, historic periods, specific background, etc.

Figure 4A:
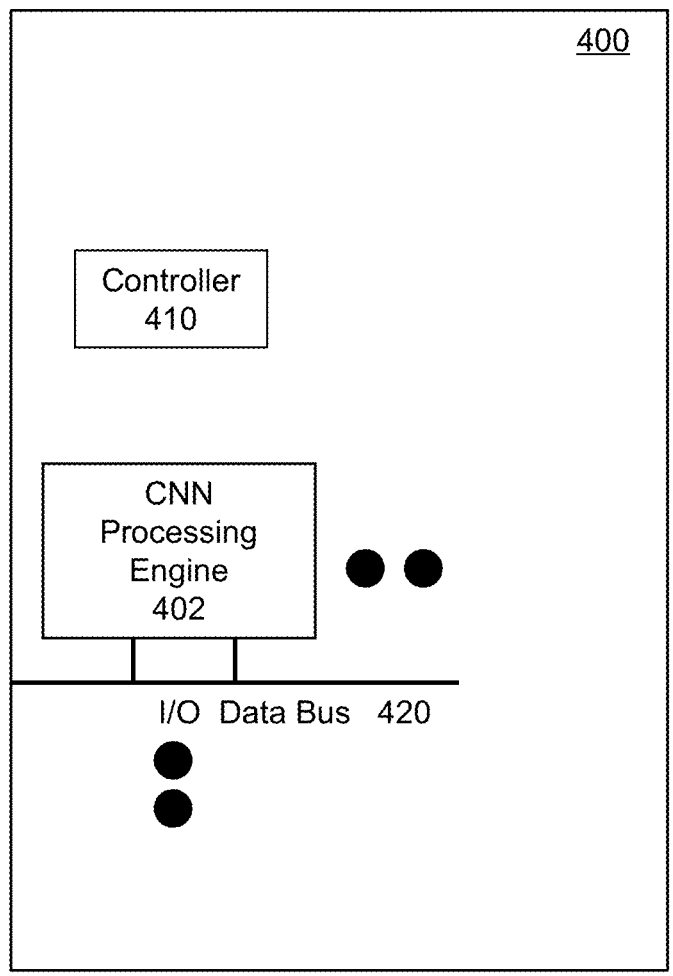
FIG. 4A is a block diagram illustrating an example Cellular Neural Networks or Cellular Nonlinear Networks (CNN) based computing system for machine learning of a combined meaning of multiple ideograms contained in a two-dimensional symbol, according to one embodiment of the invention.

Referring now to FIG. 4A, it is shown a block diagram illustrating an example CNN based computing system 400 configured for machine learning of a combined meaning of multiple ideograms contained in a two-dimensional symbol (e.g., the two-dimensional symbol 100).

The CNN based computing system 400 may be implemented on integrated circuits as a digital semi-conductor chip (e.g., a silicon substrate) and contains a controller 410, and a plurality of CNN processing units 402a-402b operatively coupled to at least one input/output (I/O) data bus 420. Controller 410 is configured to control various operations of the CNN processing units 402a-402b, which are connected in a loop with a clock-skew circuit.

In one embodiment, each of the CNN processing units 402a-402b is configured for processing imagery data, for example, two-dimensional symbol 100 of FIG. 1.

To store an ideogram collection set, one or more storage units operatively coupled to the CNN based computing system 400 are required. Storage units (not shown) can be located either inside or outside the CNN based computing system 400 based on well known techniques.

"Super-character" may contain more than one meanings in certain instances. "Super-character" can tolerate certain errors that can be corrected with error-correction techniques. In other words, the pixels represent ideograms do not have to be exact. The errors may have different causes, for example, data corruptions, during data retrieval, etc.

Figure 4B:
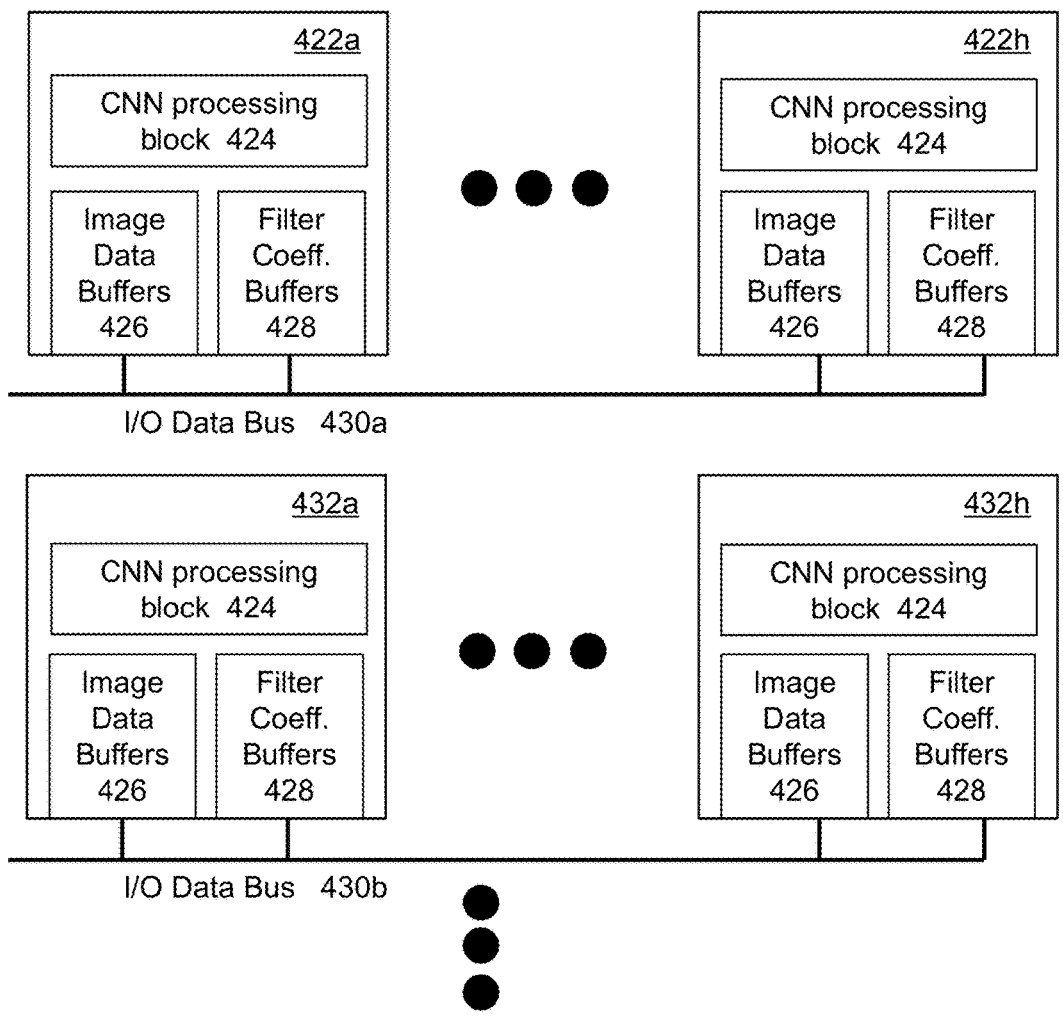
FIG. 4B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 4B.

All of the CNN processing engines are identical. For illustration simplicity, only few (i.e., CNN processing engines 422a-422h, 432a-432h) are shown in FIG. 4B. The invention sets no limit to the number of CNN processing engines on a digital semi-conductor chip.

Each CNN processing engine 422a-422h, 432a-432h contains a CNN processing block 424, a first set of memory buffers 426 and a second set of memory buffers 428. The first set of memory buffers 426 is configured for receiving imagery data and for supplying the already received imagery data to the CNN processing block 424. The second set of memory buffers 428 is configured for storing filter coefficients and for supplying the already received filter coefficients to the CNN processing block 424. In general, the number of CNN processing engines on a chip is $2^n$, where n is an integer (i.e., 0, 1, 2, 3, . . . ). As shown in FIG. 4B, CNN processing engines 422a-422h are operatively coupled to a first input/output data bus 430a while CNN processing engines 432a-432h are operatively coupled to a second input/output data bus 430b. Each input/output data bus 430a-430b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 430a-430b are shown here to connect the CNN processing engines 422a-422h, 432a-432h in a sequential scheme. In another embodiment, the at least one I/O data bus may have different connection scheme to the CNN processing engines to accomplish the same purpose of parallel data input and output for improving performance.

Figure 5A:
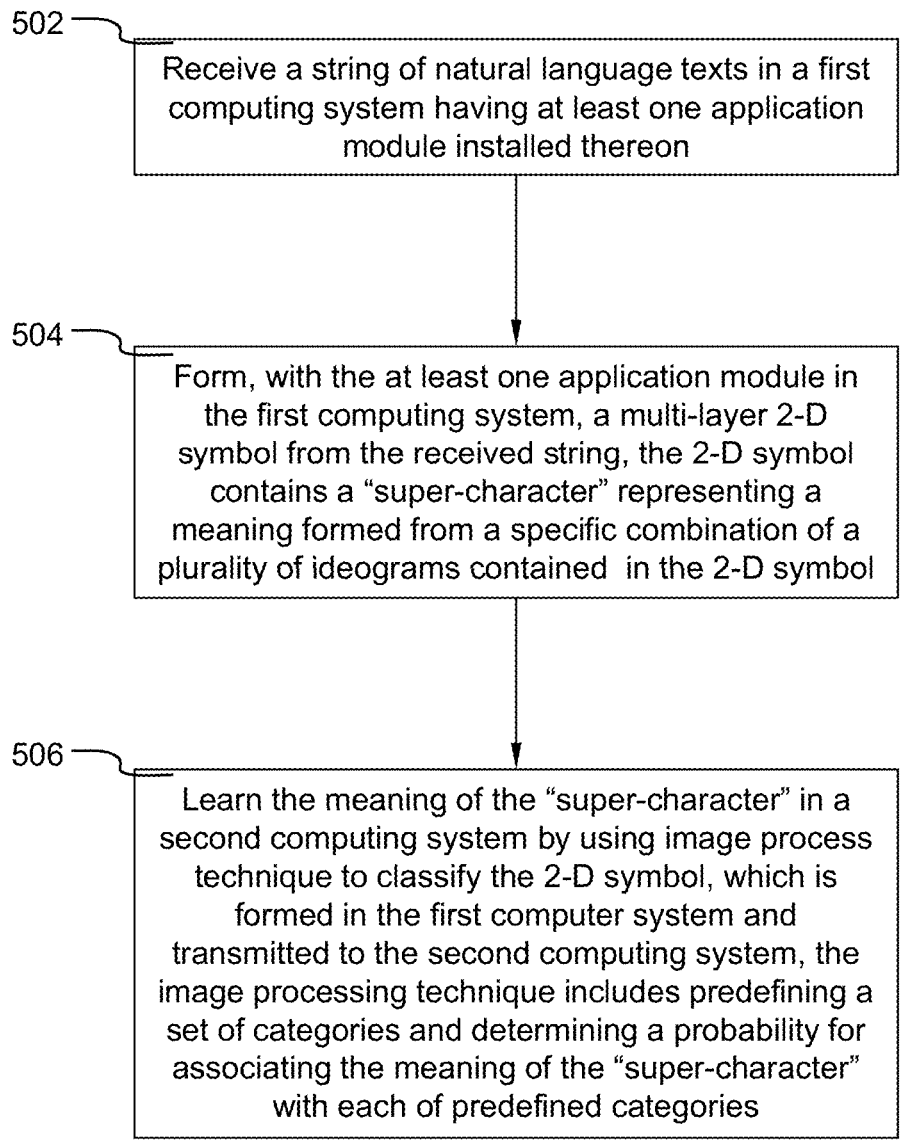
FIG. 5A is a flowchart illustrating an example process of machine learning of written natural languages using a multi-layer two-dimensional symbol in accordance with an embodiment of the invention.
Figure 5B:
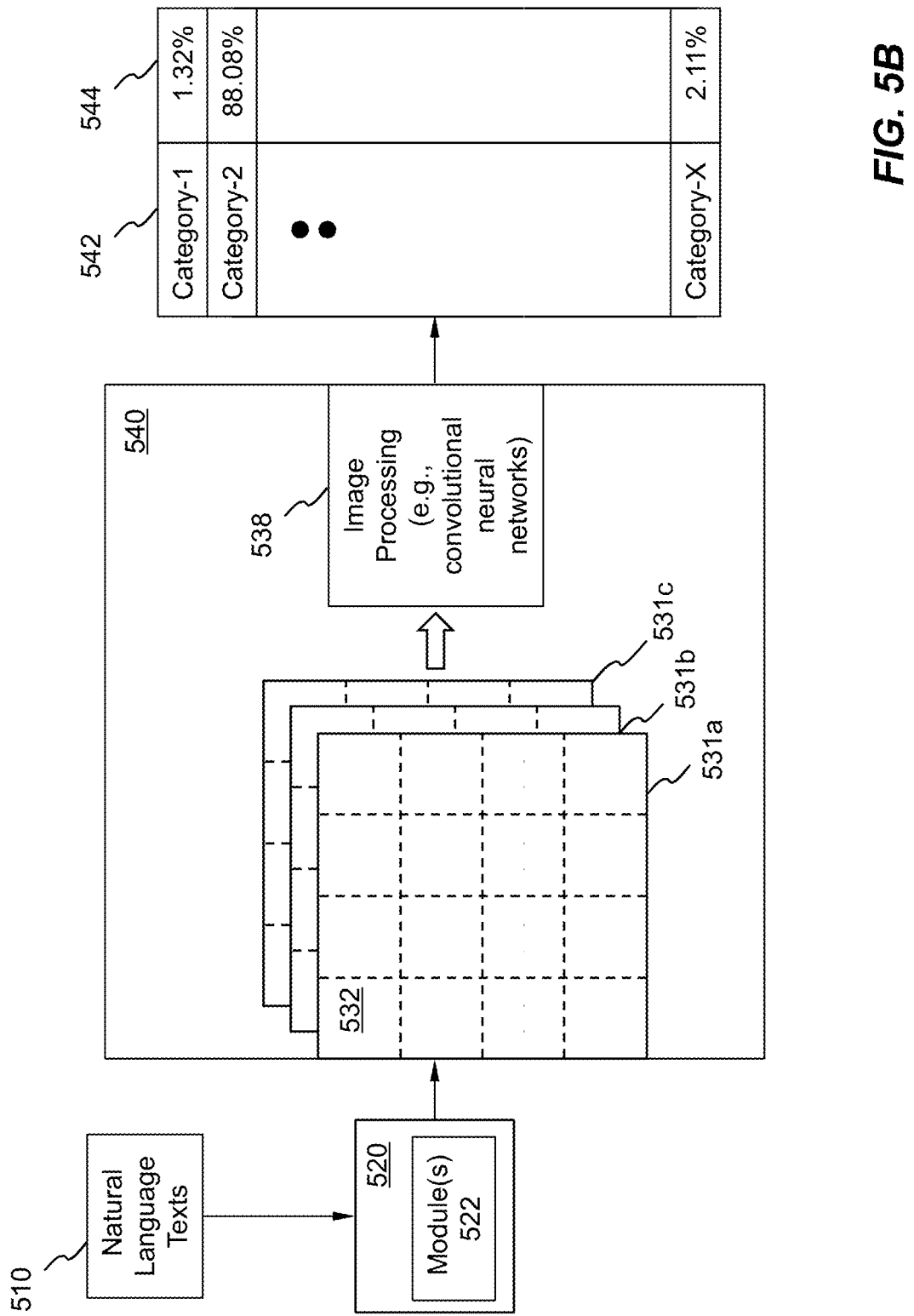
FIG. 5B is a schematic diagram showing an example natural language processing via a multi-layer two-dimensional symbol with image processing technique in accordance with an embodiment of the invention.

FIG. 5A is a flowchart illustrating an example process 500 of machine learning of written natural languages using a multi-layer two-dimensional symbol in accordance with an embodiment of the invention. Process 500 can be implemented in software as an application module installed in at least one computer system. Process 500 may also be implemented in hardware (e.g., integrated circuits). FIG. 5B is a schematic diagram showing example natural language processing via a multi-layer two-dimensional symbol with image process technique in accordance with an embodiment of the invention.

Process 500 starts at action 502 by receiving a string of natural language texts 510 in a first computing system 520 having at least one application module 522 installed thereon. The first computing system 520 can be a general computer capable of converting a string of natural language texts 510 to a multi-layer two-dimensional symbol 531a-531c (i.e., an image contained in a matrix of N×N pixels of data in multiple layers).

Next, at action 504, a multi-layer two-dimensional symbol 531a-531c containing M×M ideograms 532 (e.g., two-dimensional symbol 100 of FIG. 1) are formed from the received string 510 with the at least one application module 522 in the first computing system 520. M is a positive integer. Each two-dimensional symbol 531a-531c is a matrix of N×N pixels of data containing a "super-character". The matrix is divided into M×M sub-matrices representing respective M×M ideograms. "Super-character" represents a meaning formed from a specific combination of a plurality of ideograms contained in the multi-layer two-dimensional symbol 531a-531c. M and N are positive integers, and N is preferably a multiple of M. More details of forming the multi-layer two-dimensional symbol are shown in FIG. 6 and corresponding descriptions.

Finally, at action 506, the meaning of the "super-character" contained in the multi-layer two-dimensional symbol 531a-531c is learned in a second computing system 540 by using an image processing technique 538 to classify the multi-layer two-dimensional symbol 531a-531c, which is formed in the first computing system 520 and transmitted to the second computing system 540. The second computing system 540 is capable of image processing of imagery data such as the multi-layer two-dimensional symbol 531*a*-531*c*.

Transmitting the multi-layer 2-D symbol 531*a*-531*c* can be performed with many well-known manners, for example, through a network either wired or wireless.

In one embodiment, the first computing system 520 and the second computing system 540 are the same computing system (not shown).

In yet another embodiment, the first computing system 520 is a general computing system while the second computing system 540 is a CNN based computing system 400 implemented as integrated circuits on a semi-conductor chip shown in FIG. 4A.

The image processing technique 538 includes predefining a set of categories 542 (e.g., "Category-1", "Category-2", . . . "Category-X" shown in FIG. 5B). As a result of performing the image processing technique 538, respective probabilities 544 of the categories are determined for associating each of the predefined categories 542 with the meaning of the "super-character". In the example shown in FIG. 5B, the highest probability of 88.08 percent is shown for "Category-2". In other words, the multi-layer two-dimensional symbol 531*a*-531*c* contains a "super-character" whose meaning has a probability of 88.08 percent associated with "Category-2" amongst all the predefined categories 544.

In another embodiment, predefined categories contain commands that can activate a sequential instructions on a smart electronic device (e.g., computing device, smart phone, smart appliance, etc.). For example, a multi-layer two-dimensional symbol is formed from a string of 16 logosyllabic Chinese characters. "Super-character" in the multi-layer 2-D symbol thus contains 16 ideograms in three colors (i.e., red, green and blue). After applying image processing technique to imagery data of the 2-D symbol, a series of commands for smart electronic devices is obtained by classifying the imagery data with a set of predefined commands. In this particular example, the meaning of the 16 logosyllabic Chinese characters is "open an online map and find the nearest route to fast food". The series of commands may be as follows:
1) open "online map"
2) search "fast food near me"
3) enter
4) click "Go"

Figure 7:
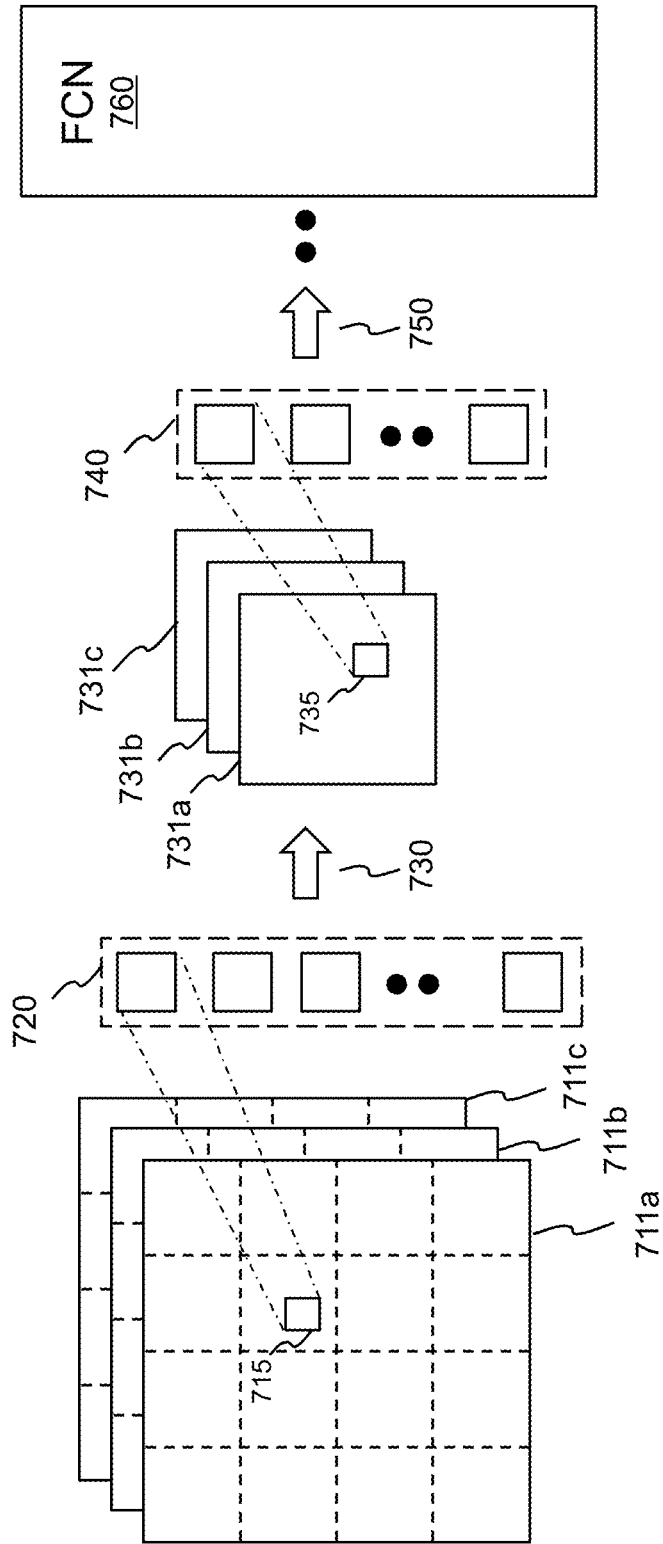
FIG. 7 is a schematic diagram showing an example image processing technique based on convolutional neural networks in accordance with an embodiment of the invention.

In one embodiment, image processing technique 538 comprises example convolutional neural networks shown in FIG. 7. In another embodiment, image processing technique 538 comprises support vector machine (SVM) with manual feature engineering on images of specific set of logosyllabic characters (e.g., Chinese characters).

Figure 6A:
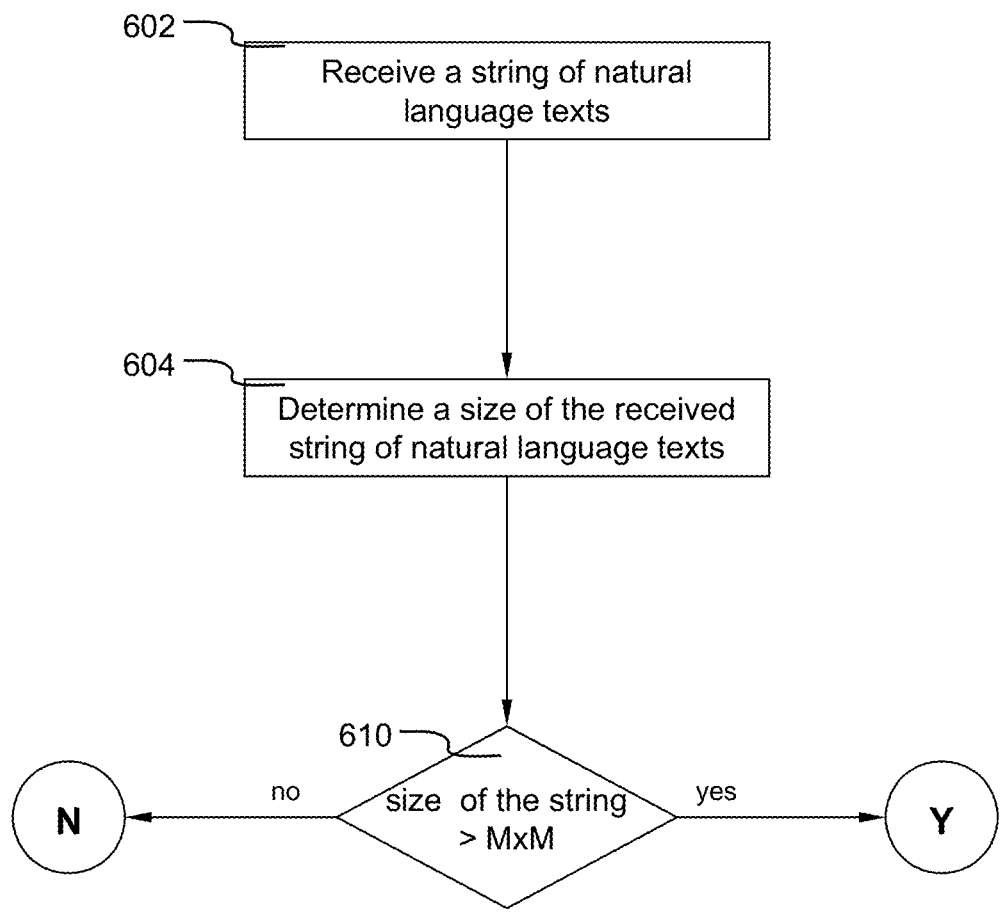
FIGS. 6A-6C are collectively a flowchart illustrating an example process of forming a two-dimensional symbol containing multiple ideograms from a string of natural language texts in accordance with an embodiment of the invention.
Figure 6B:
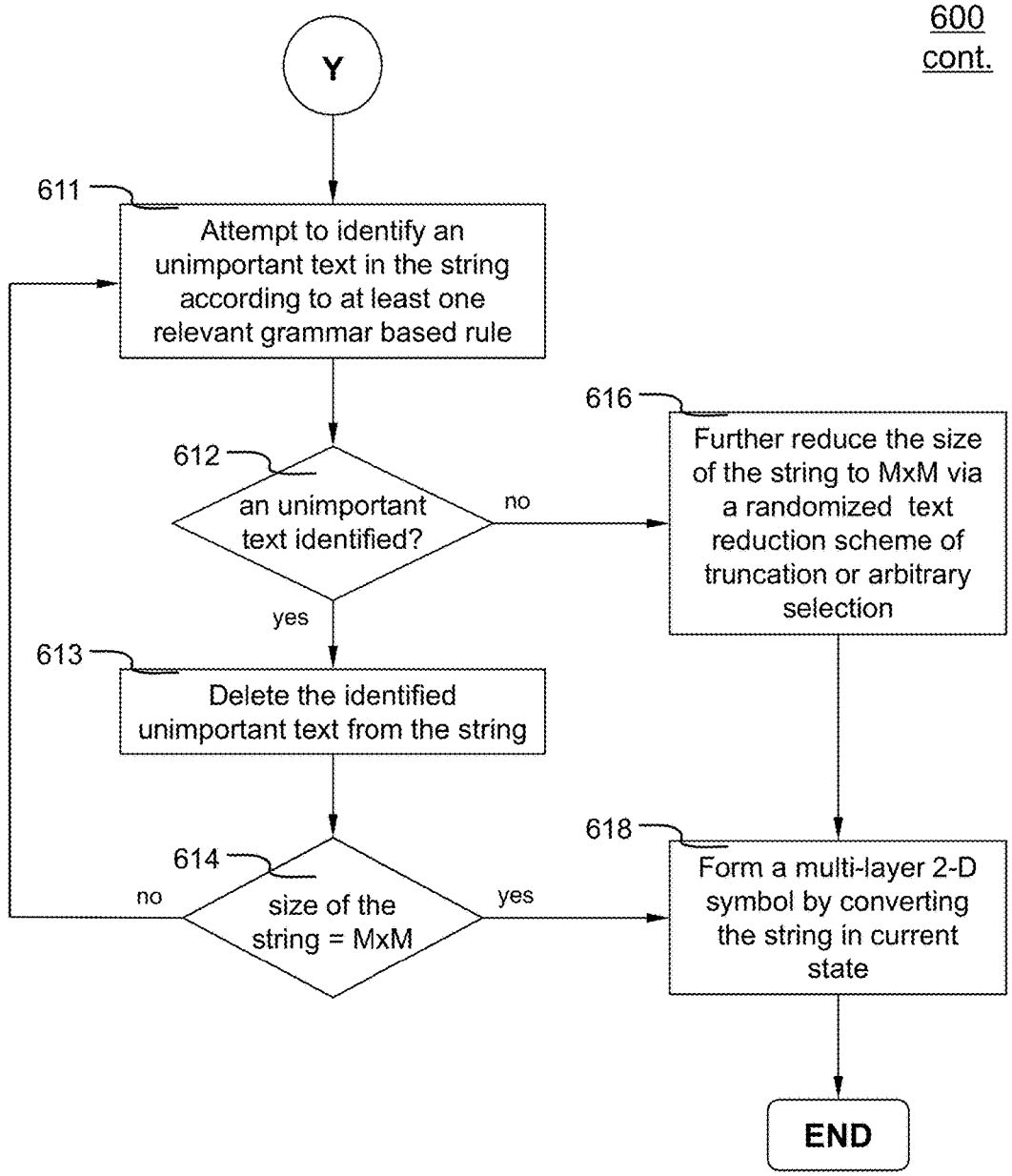
Figure 6C:
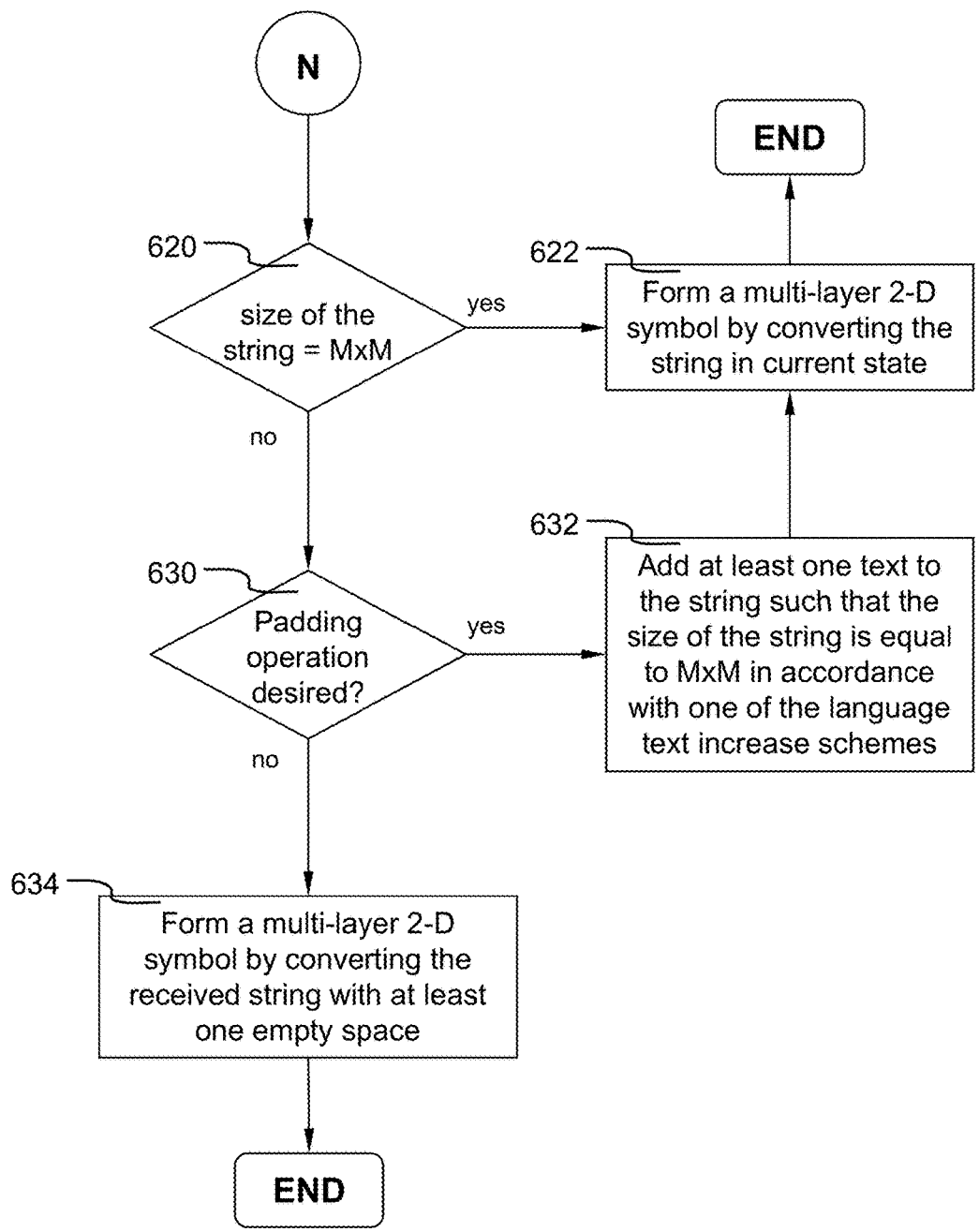

FIGS. 6A-6C are collectively a flowchart illustrating an example process 600 of forming a two-dimensional (2-D) symbol containing multiple ideograms from a string of natural language texts in accordance with an embodiment of the invention. Process 600 can be implemented in software as an application module installed in a computer system. Process 600 can also be implemented in hardware (e.g., integrated circuits).

Process 600 starts at action 602 by receiving a string of natural language texts in a computing system having at least one application module installed thereon. An example application module is a software that contains instructions for the computing system to perform the actions and decisions set forth in process 600. The string of natural language texts may include, but are not necessarily limited to, logosyllabic characters, numerals, special characters, western languages based on Latin letters, etc. The string of natural language texts can be inputted to the computing system via various well-known manners, for example, keyboard, mouse, voice-to-text, etc.

Next, at action 604, a size of the received string of natural language texts is determined. Then at decision 610, it is determined whether the size is greater than M×M (i.e., the maximum number of ideograms in the two-dimensional symbol). In one embodiment, M is 4 and M×M is therefore 16. In another embodiment, M is 8 and M×M is then 64.

When decision 610 is true, the received string is too large to be fit into the 2-D symbol and must be first reduced in accordance with at least one language text reduction scheme described below.

Process 600 follows the 'yes' branch to action 611. Process 600 attempts to identify an unimportant text in the string according to at least one relevant grammar based rule. The relevant grammar based rule is associated with the received string of natural language texts. For example, when the natural language is Chinese, the relevant grammar is the Chinese grammar. Next, at decision 612, it is determined whether an unimportant text is identified or not. If 'yes', at action 613, the identified unimportant text is deleted from the string, and therefore the size of the string is reduced by one. At decision 614, the size of the string is determined if it is equal to M×M. If not, process 600 goes back to repeat the loop of action 611, decision 612, action 613 and decision 614. If decision 614 is true, process 600 ends after performing action 618, in which a multi-layer 2-D symbol is formed by converting the string in its current state (i.e., may have one or more unimportant texts deleted).

During the aforementioned loop 611-614, if there is no more unimportant text in the received string, decision 612 becomes 'no'. Process 600 moves to action 616 to further reduce the size of the string to M×M via a randomized text reduction scheme, which can be truncation or arbitrary selection. At action 618, a multi-layer 2-D symbol is formed by converting the string in its current state. Process 600 ends thereafter.

The randomized text reduction scheme and the aforementioned scheme of deleting unimportant text are referred to as the at least one language text reduction scheme.

Referring back to decision 610, if it is false, process 600 follows the 'no' branch to decision 620. If the size of the received string is equal to M×M, decision 620 is true. Process 600 moves to action 622, in which a multi-layer 2-D symbol is formed by converting the received string. Process 600 ends thereafter.

If decision 620 is false (i.e., the size of the received string is less than M×M), process 600 moves to another decision 630, in which it is determined whether a padding operation of the 2-D symbol is desired. If 'yes', at action 632, the string is padded with at least one text to increase the size of the string to M×M in accordance with at least one language text increase scheme. In other words, at least one text is added to the string such that the size of the string is equal to M×M. In one embodiment, the language text increase scheme requires one or more key texts be identified from the received string first. Then one or more identified key texts are repeatedly appended to the received string. In another embodiment, the language text increase scheme requires one or more texts from the receiving string be repeatedly appended to the string. Next, action 622 is performed to form a multi-layer 2-D symbol by converting the padded string (i.e., the received string plus at least one additional text). Process 600 ends thereafter.

If decision 630 is false, process 600 ends after performing action 634. A multi-layer 2-D symbol is formed by converting the received string, which has a size less than M×M. As a result, the 2-D symbol contains at least one empty space. In one embodiment, the multi-layer two-dimensional symbol 531a-531c contains three layers for red, green and blue hues. Each pixel in each layer of the two-dimension symbol contains K-bit. In one embodiment, K equals to 8 for supporting true color, which contains 256 shades of red, green and blue. In another embodiment, K equals to 5 for a reduced color map having 32 shades of red, green and blue.

FIG. 7 is a schematic diagram showing an example image processing technique based on convolutional neural networks in accordance with an embodiment of the invention.

Based on convolutional neural networks, a multi-layer two-dimensional symbol 711a-711c as input imagery data is processed with convolutions using a first set of filters or weights 720. Since the imagery data of the 2-D symbol 711a-711c is larger than the filters 720. Each corresponding overlapped sub-region 715 of the imagery data is processed. After the convolutional results are obtained, activation may be conducted before a first pooling operation 730. In one embodiment, activation is achieved with rectification performed in a rectified linear unit (ReLU). As a result of the first pooling operation 730, the imagery data is reduced to a reduced set of imagery data 731a-731c. For 2×2 pooling, the reduced set of imagery data is reduced by a factor of 4 from the previous set.

The previous convolution-to-pooling procedure is repeated. The reduced set of imagery data 731a-731c is then processed with convolutions using a second set of filters 740. Similarly, each overlapped sub-region 735 is processed. Another activation can be conducted before a second pooling operation 740. The convolution-to-pooling procedures are repeated for several layers and finally connected to a Fully Connected Networks (FCN) 760. In image classification, respective probabilities 544 of predefined categories 542 can be computed in FCN 760.

This repeated convolution-to-pooling procedure is trained using a known dataset or database. For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation. In one embodiment, the imagery data is the multi-layer two-dimensional symbol 711a-711c, which is form from a string of natural language texts.

In one embodiment, convolutional neural networks are based on a Visual Geometry Group (VGG16) architecture neural nets.

Figure 8:
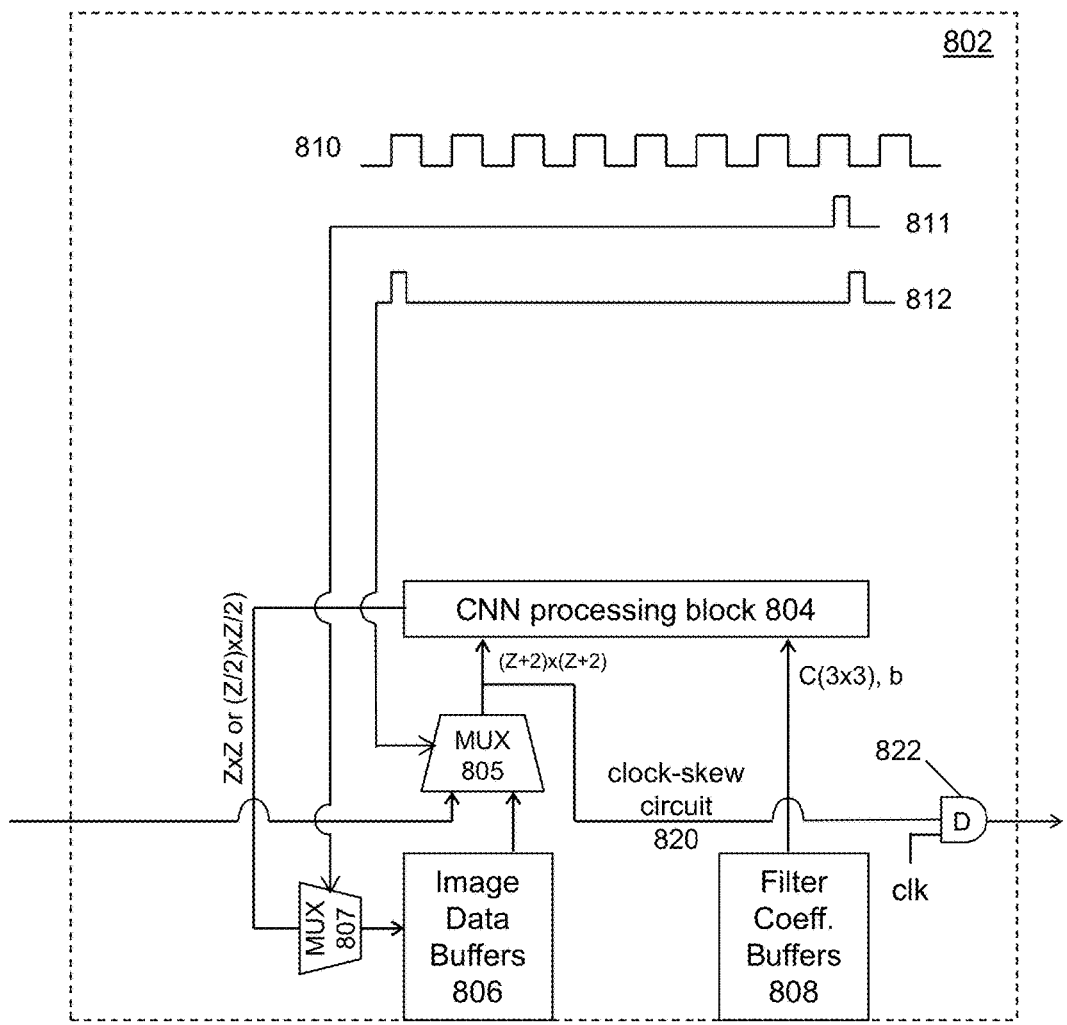
FIG. 8 is a diagram showing an example CNN processing engine in a CNN based integrated circuit, according to one embodiment of the invention.

More details of a CNN processing engine 802 in a CNN based integrated circuit are shown in FIG. 8. A CNN processing block 804 contains digital circuitry that simultaneously obtains Z×Z convolution operations results by performing 3×3 convolutions at Z×Z pixel locations using imagery data of a (Z+2)-pixel by (Z+2)-pixel region and corresponding filter coefficients from the respective memory buffers. The (Z+2)-pixel by (Z+2)-pixel region is formed with the Z×Z pixel locations as an Z-pixel by Z-pixel central portion plus a one-pixel border surrounding the central portion. Z is a positive integer. In one embodiment, Z equals to 14 and therefore, (Z+2) equals to 16, Z×Z equals to 14×14=196, and Z/2 equals 7.

Figure 9:
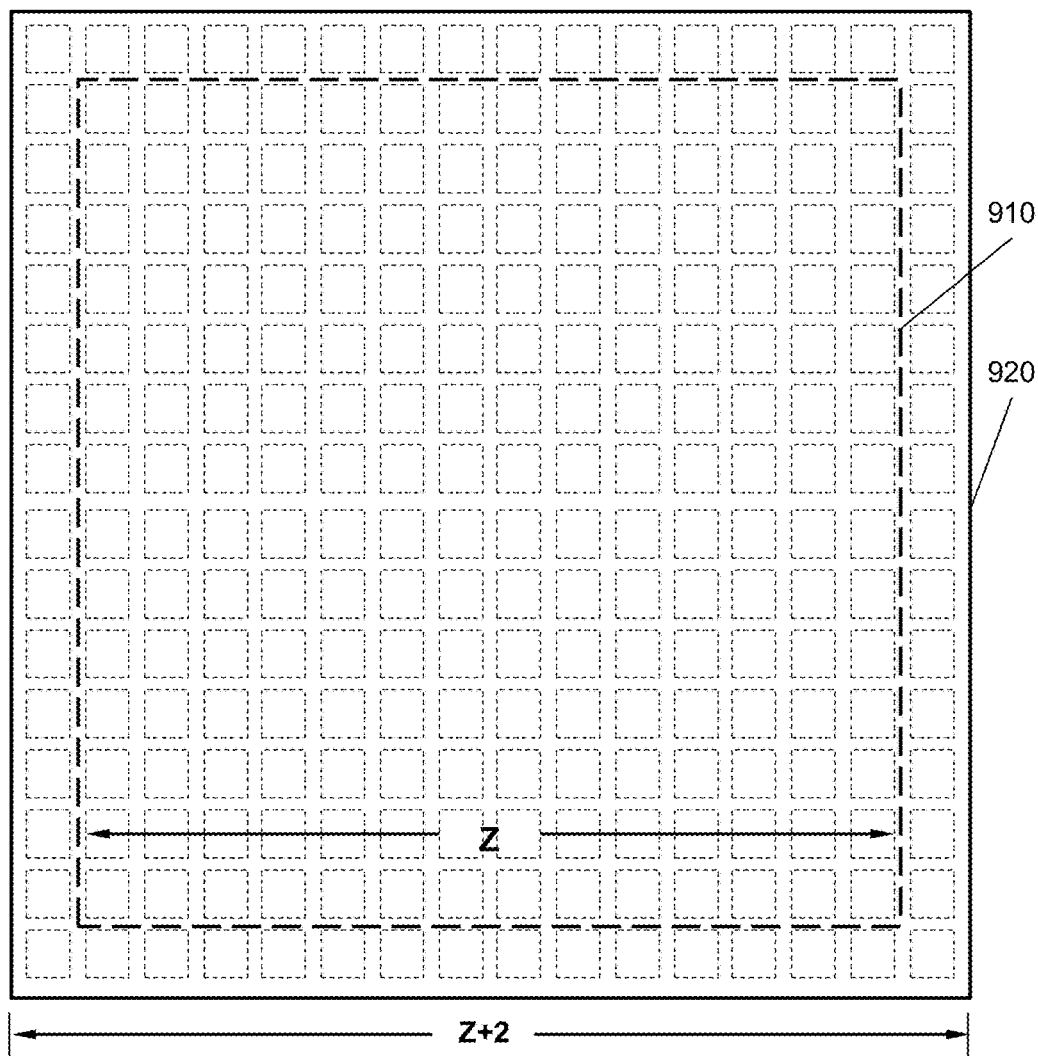
FIG. 9 is a diagram showing an example imagery data region within the example CNN processing engine of FIG. 8, according to an embodiment of the invention.

FIG. 9 is a diagram showing a diagram representing (Z+2)-pixel by (Z+2)-pixel region 910 with a central portion of Z×Z pixel locations 920 used in the CNN processing engine 802.

In order to achieve faster computations, few computational performance improvement techniques have been used and implemented in the CNN processing block 804. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\text{Out}(m, n) = \sum_{1 \le i, j \le 3} \text{In}(m, n, i, j) \times C(i, j) - b \quad (1)$$

where:
  m, n are corresponding row and column numbers for identifying which imagery data (pixel) within the (Z+2)-pixel by (Z+2)-pixel region the convolution is performed;
  In(m,n,i,j) is a 3-pixel by 3-pixel area centered at pixel location (m, n) within the region;
  C(i, j) represents one of the nine weight coefficients C(3×3), each corresponds to one of the 3-pixel by 3-pixel area;
  b represents an offset or bias coefficient; and
  i, j are indices of weight coefficients C(i, j).

Each CNN processing block 804 produces Z×Z convolution operations results simultaneously and, all CNN processing engines perform simultaneous operations. In one embodiment, the 3×3 weight or filter coefficients are each 12-bit while the offset or bias coefficient is 16-bit or 18-bit.

Figure 10A:
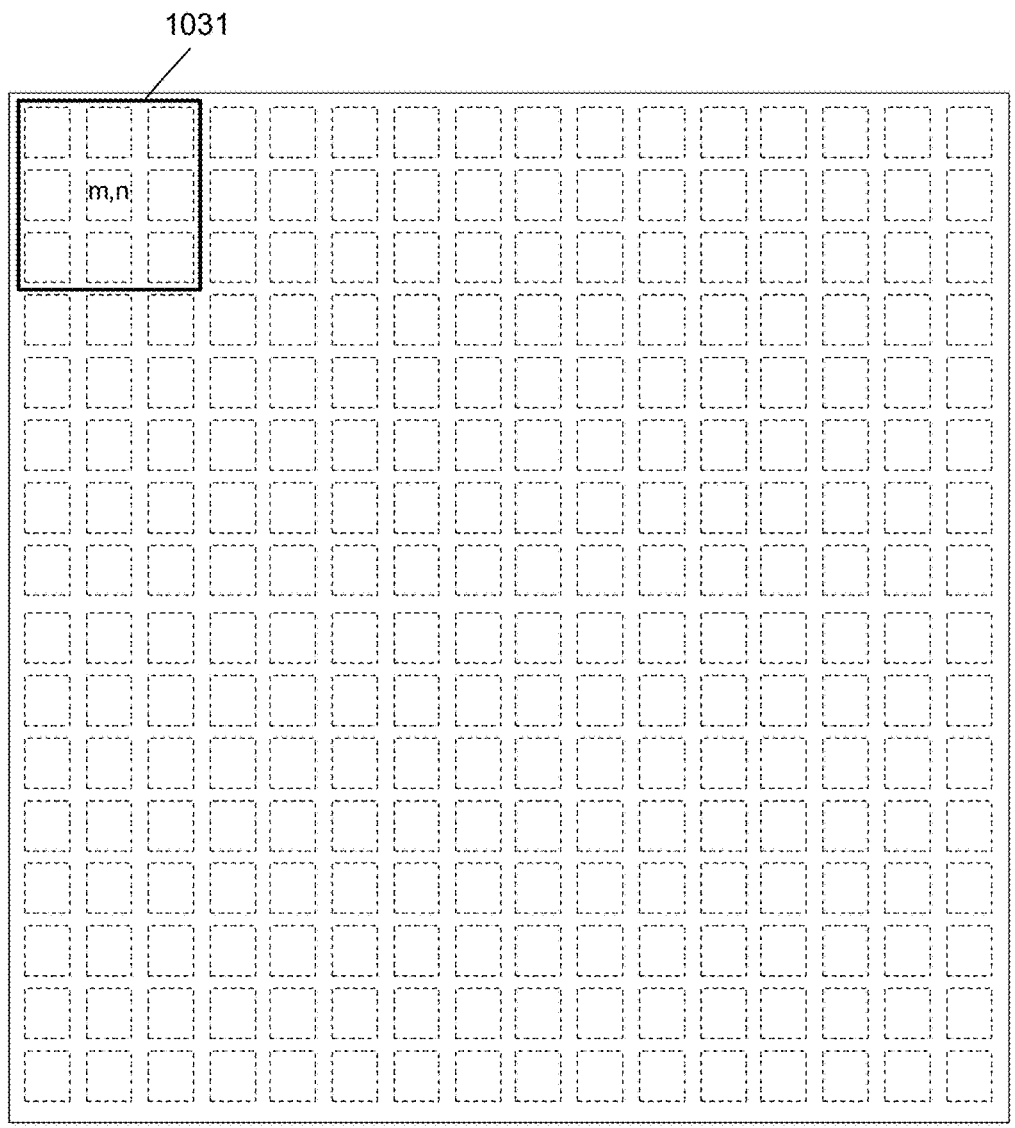
FIGS. 10A-10C are diagrams showing three example pixel locations within the example imagery data region of FIG. 9, according to an embodiment of the invention.
Figure 10B:
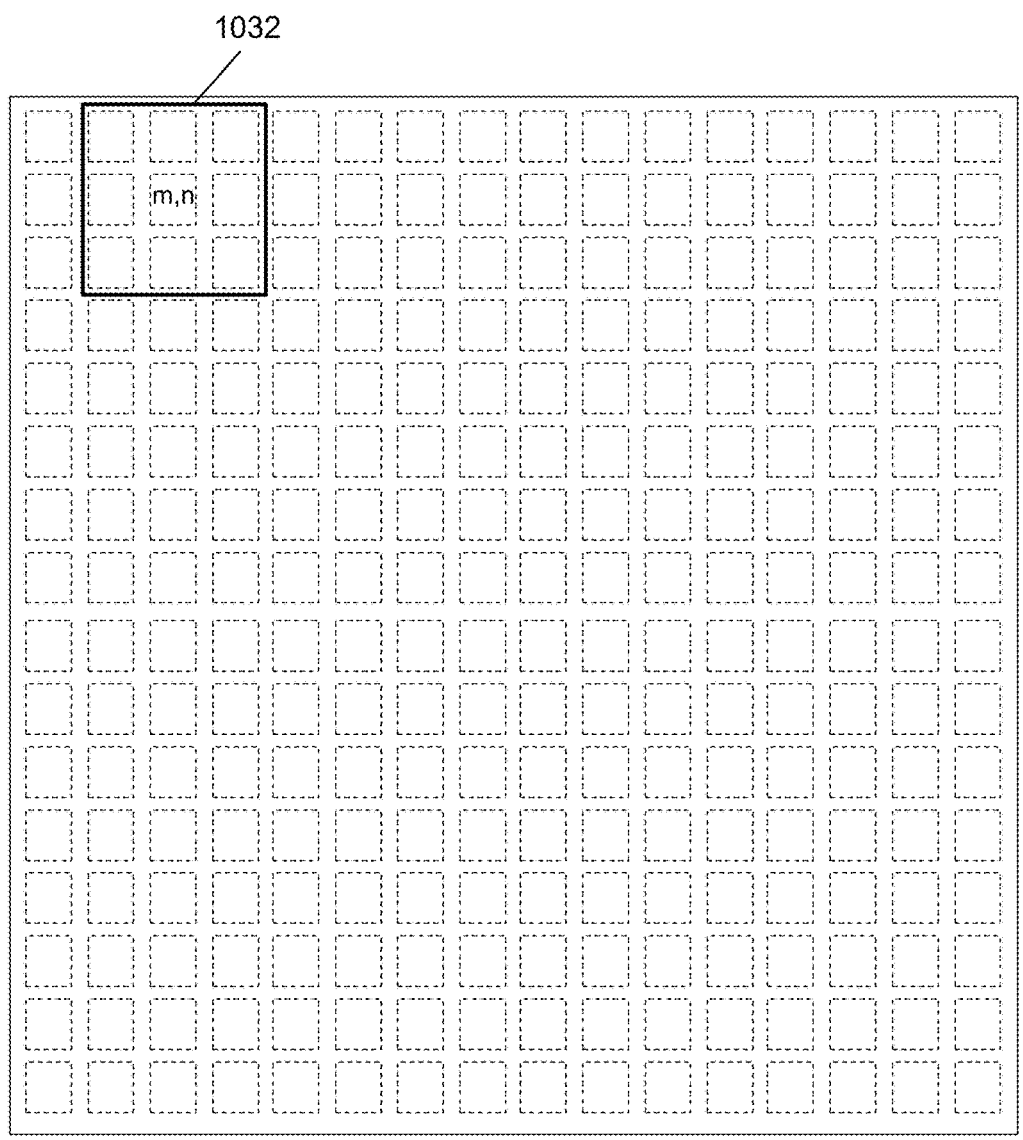
Figure 10C:
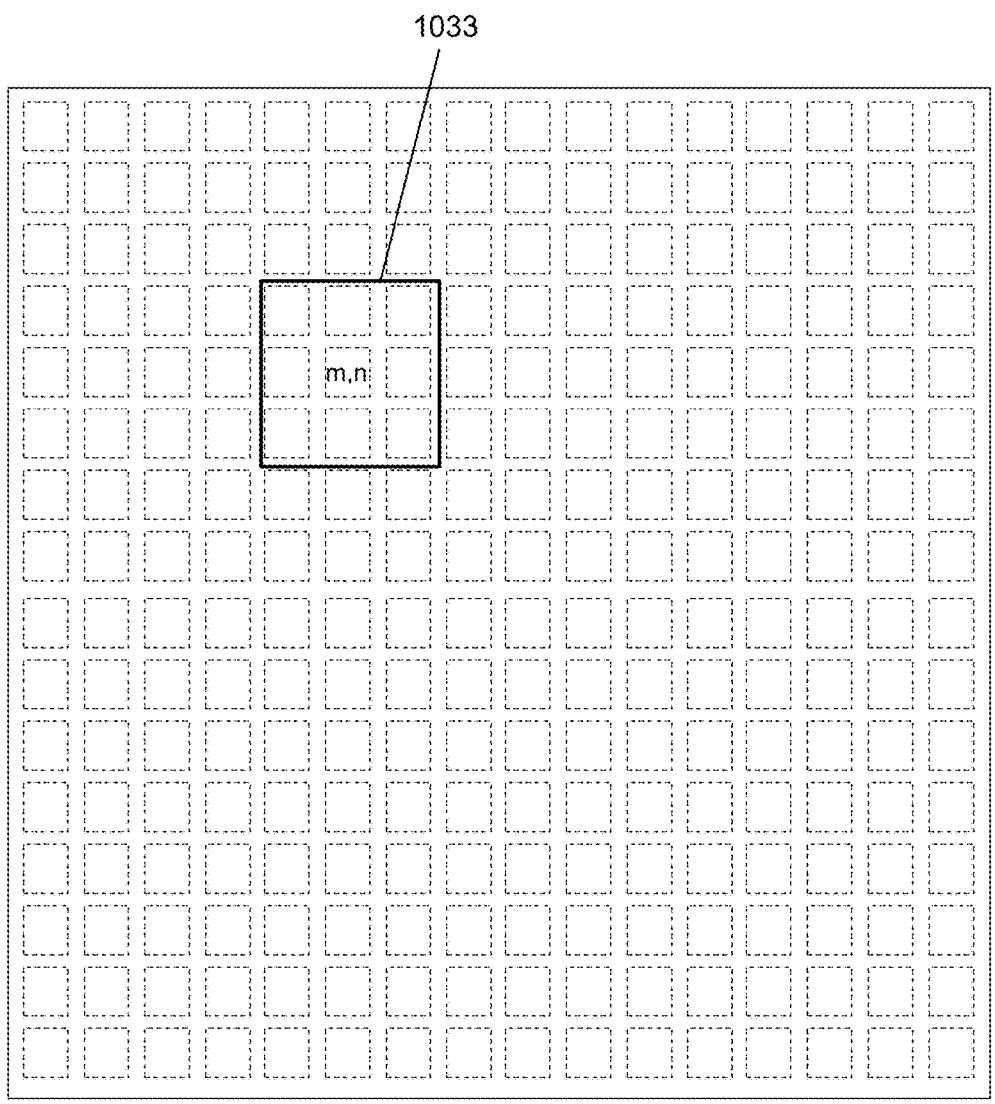

FIGS. 10A-10C show three different examples of the Z×Z pixel locations. The first pixel location 1031 shown in FIG. 10A is in the center of a 3-pixel by 3-pixel area within the (Z+2)-pixel by (Z+2)-pixel region at the upper left corner. The second pixel location 1032 shown in FIG. 10B is one pixel data shift to the right of the first pixel location 1031. The third pixel location 1033 shown in FIG. 10C is a typical example pixel location. Z×Z pixel locations contain multiple overlapping 3-pixel by 3-pixel areas within the (Z+2)-pixel by (Z+2)-pixel region.

Figure 11:
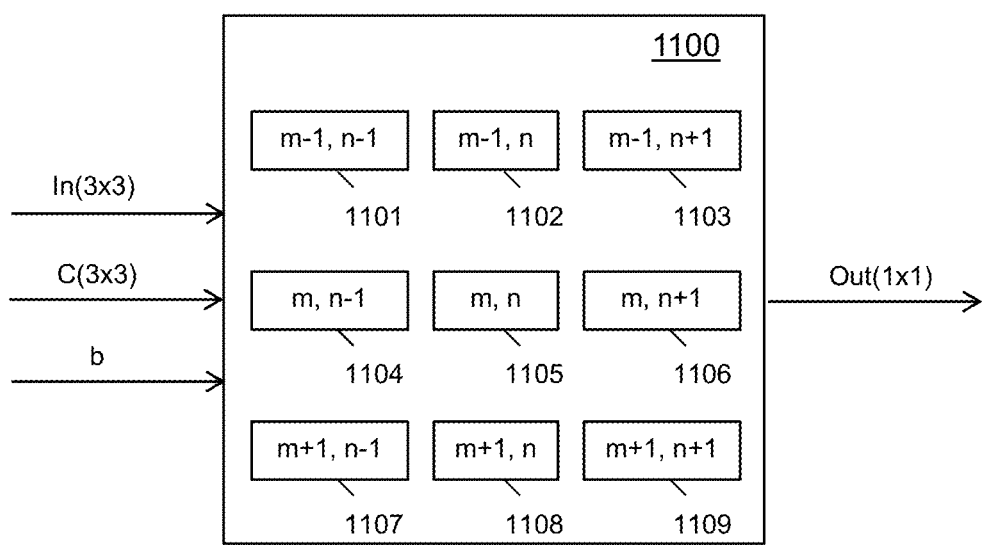
FIG. 11 is a diagram illustrating an example data arrangement for performing 3×3 convolutions at a pixel location in the example CNN processing engine of FIG. 8, according to one embodiment of the invention.

To perform 3×3 convolutions at each sampling location, an example data arrangement is shown in FIG. 11. Imagery data (i.e., In(3×3)) and filter coefficients (i.e., weight coefficients C(3×3) and an offset coefficient b) are fed into an example CNN 3×3 circuitry 1100. After 3×3 convolutions operation in accordance with Formula (1), one output result (i.e., Out(1×1)) is produced. At each sampling location, the imagery data In(3×3) is centered at pixel coordinates (m, n) 1105 with eight immediate neighbor pixels 1101-1104, 1106-1109.

Imagery data are stored in a first set of memory buffers 806, while filter coefficients are stored in a second set of memory buffers 808. Both imagery data and filter coefficients are fed to the CNN block 804 at each clock of the digital integrated circuit. Filter coefficients (i.e., C(3×3) and b) are fed into the CNN processing block 804 directly from the second set of memory buffers 808. However, imagery data are fed into the CNN processing block 804 via a multiplexer MUX 805 from the first set of memory buffers 806. Multiplexer 805 selects imagery data from the first set of memory buffers based on a clock signal (e.g., pulse 812).

Otherwise, multiplexer MUX 805 selects imagery data from a first neighbor CNN processing engine (from the left side of FIG. 8 not shown) through a clock-skew circuit 820.

At the same time, a copy of the imagery data fed into the CNN processing block 804 is sent to a second neighbor CNN processing engine (to the right side of FIG. 8 not shown) via the clock-skew circuit 820. Clock-skew circuit 820 can be achieved with known techniques (e.g., a D flip-flop 822).

After 3×3 convolutions for each group of imagery data are performed for predefined number of filter coefficients, convolution operations results Out(m, n) are sent to the first set of memory buffers via another multiplex MUX 807 based on another clock signal (e.g., pulse 811). An example clock cycle 810 is drawn for demonstrating the time relationship between pulse 811 and pulse 812. As shown pulse 811 is one clock before pulse 812, as a result, the 3×3 convolution operations results are stored into the first set of memory buffers after a particular block of imagery data has been processed by all CNN processing engines through the clock-skew circuit 820.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the Z×Z output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 12A:
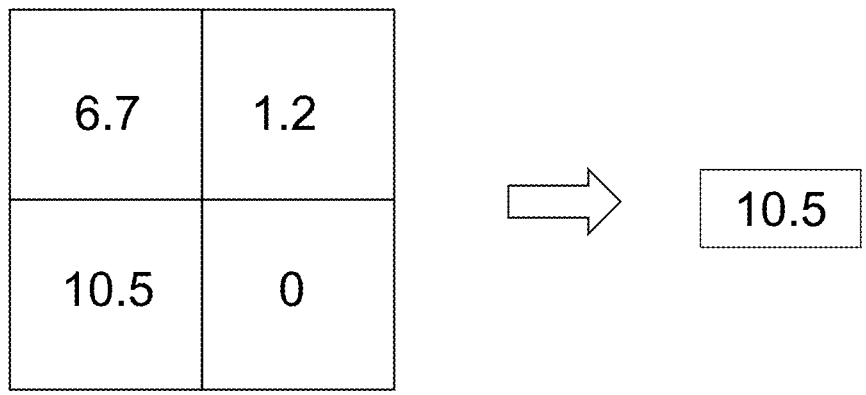
FIGS. 12A-12B are diagrams showing two example 2×2 pooling operations according to an embodiment of the invention.
Figure 12B:
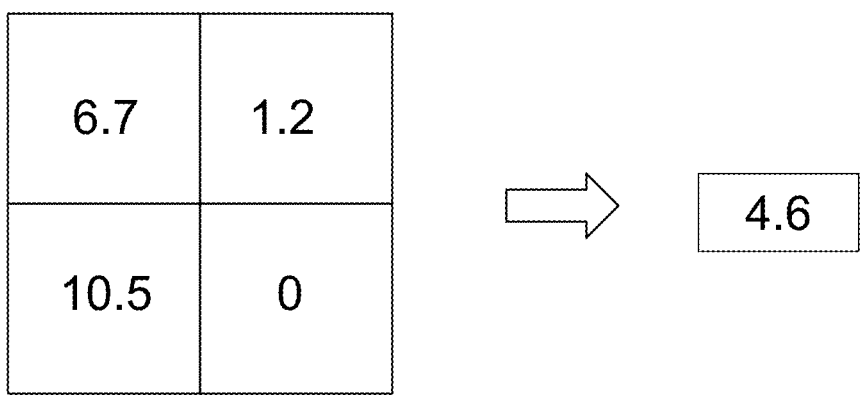
Figure 13:
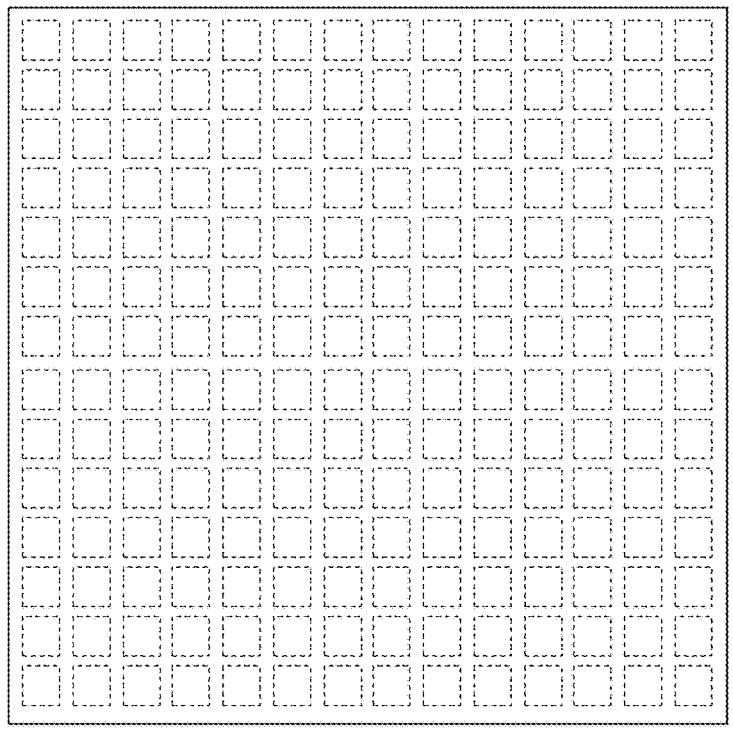
FIG. 13 is a diagram illustrating a 2×2 pooling operation of an imagery data in the example CNN processing engine of FIG. 8, according to one embodiment of the invention.
Figure 13:
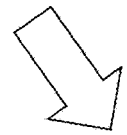
Figure 13:
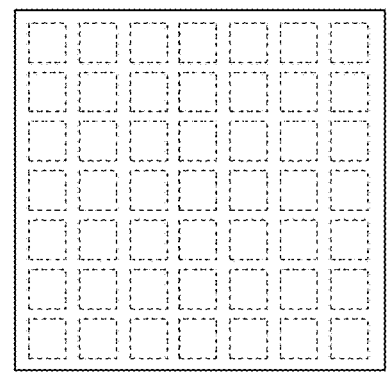

To demonstrate a 2×2 pooling operation, FIG. 12A is a diagram graphically showing first example output results of a 2-pixel by 2-pixel block being reduced to a single value 10.5, which is the largest value of the four output results. The technique shown in FIG. 12A is referred to as "max pooling". When the average value 4.6 of the four output results is used for the single value shown in FIG. 12B, it is referred to as "average pooling". There are other pooling operations, for example, "mixed max average pooling" which is a combination of "max pooling" and "average pooling". The main goal of the pooling operation is to reduce size of the imagery data being processed. FIG. 13 is a diagram illustrating Z×Z pixel locations, through a 2×2 pooling operation, being reduced to (Z/2)×(Z/2) locations, which is one fourth of the original size.

Figure 14A:
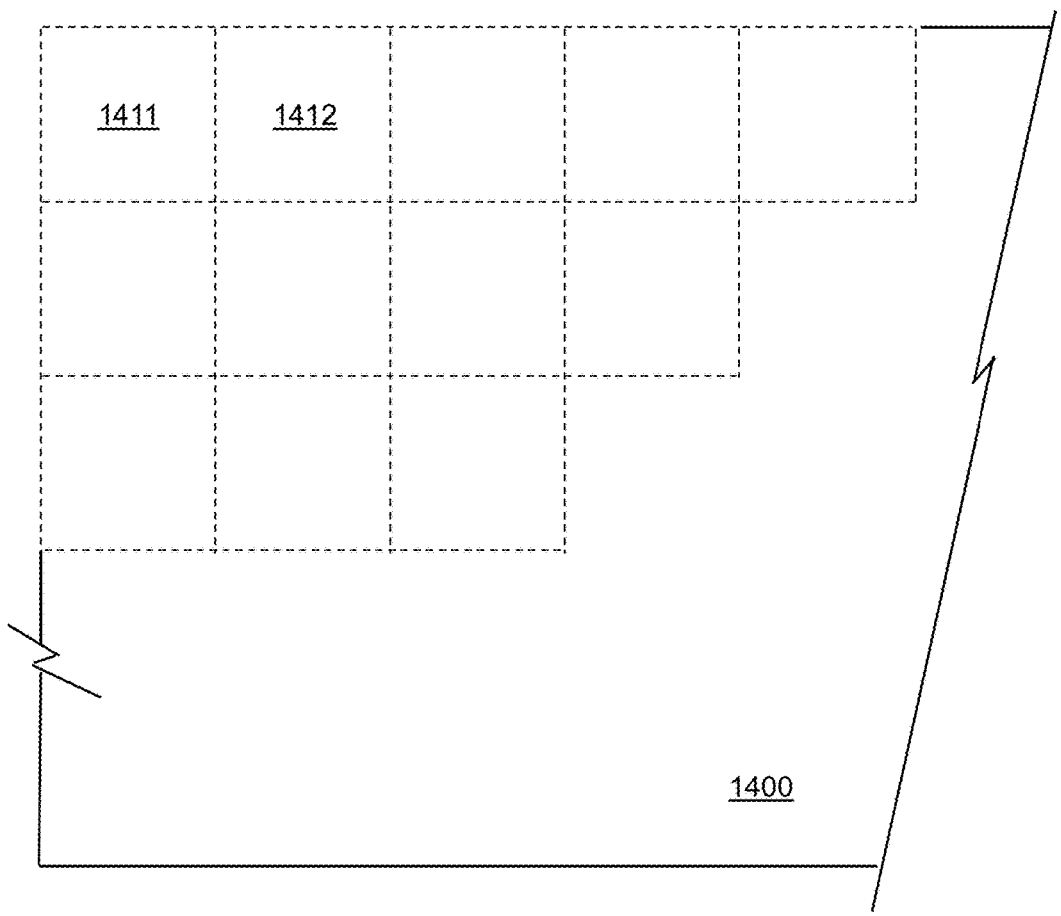
FIGS. 14A-14C are diagrams illustrating various examples of imagery data region within an input image, according to one embodiment of the invention.

An input image generally contains a large amount of imagery data. In order to perform image processing operations, an example input image 1400 (e.g., a two-dimensional symbol 100 of FIG. 1) is partitioned into Z-pixel by Z-pixel blocks 1411-1412 as shown in FIG. 14A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with ($2^L$×Z)-pixel by ($2^L$×Z)-pixel is required. L is a positive integer (e.g., 1, 2, 3, 4, etc.). When Z equals 14 and L equals 4, the characteristic dimension is 224. In another embodiment, the input image is a rectangular shape with dimensions of ($2^I$×Z)-pixel and ($2^J$×Z)-pixel, where I and J are positive integers.

Figure 14B:
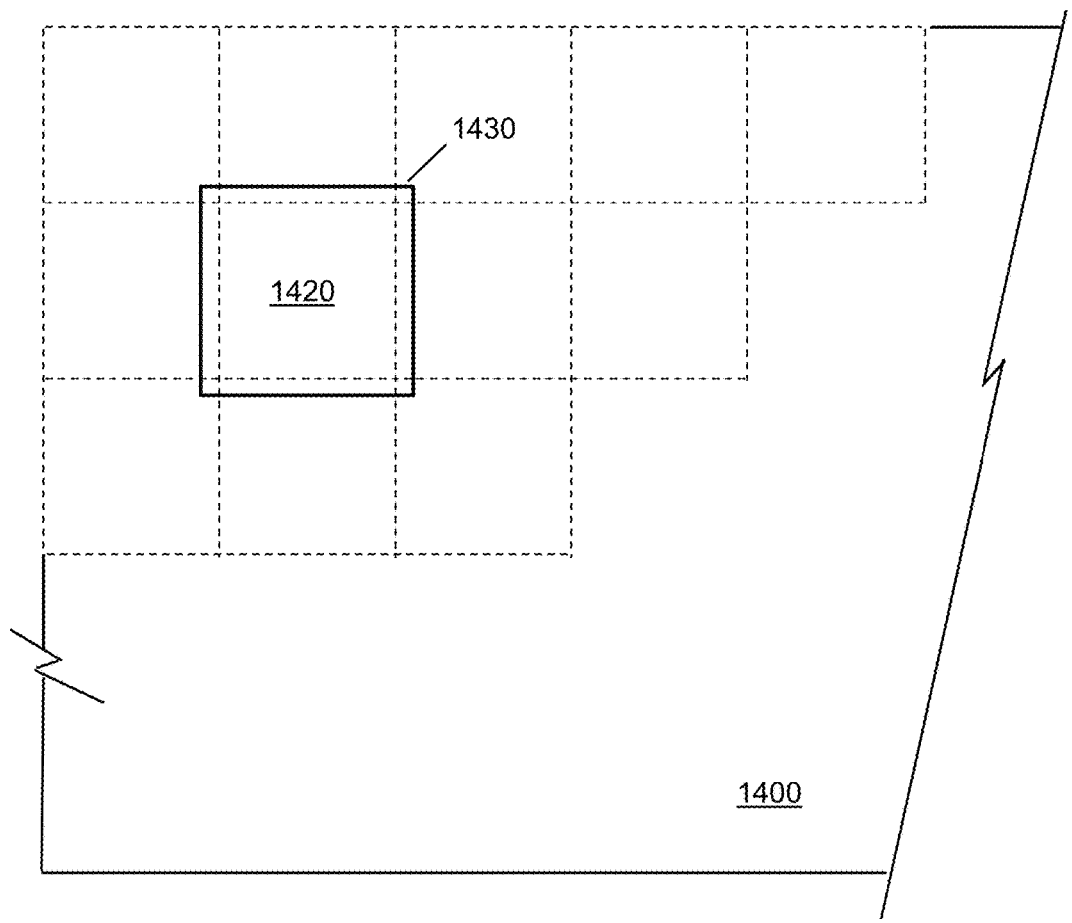

In order to properly perform 3×3 convolutions at pixel locations around the border of a Z-pixel by Z-pixel block, additional imagery data from neighboring blocks are required. FIG. 14B shows a typical Z-pixel by Z-pixel block 1420 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 14C:
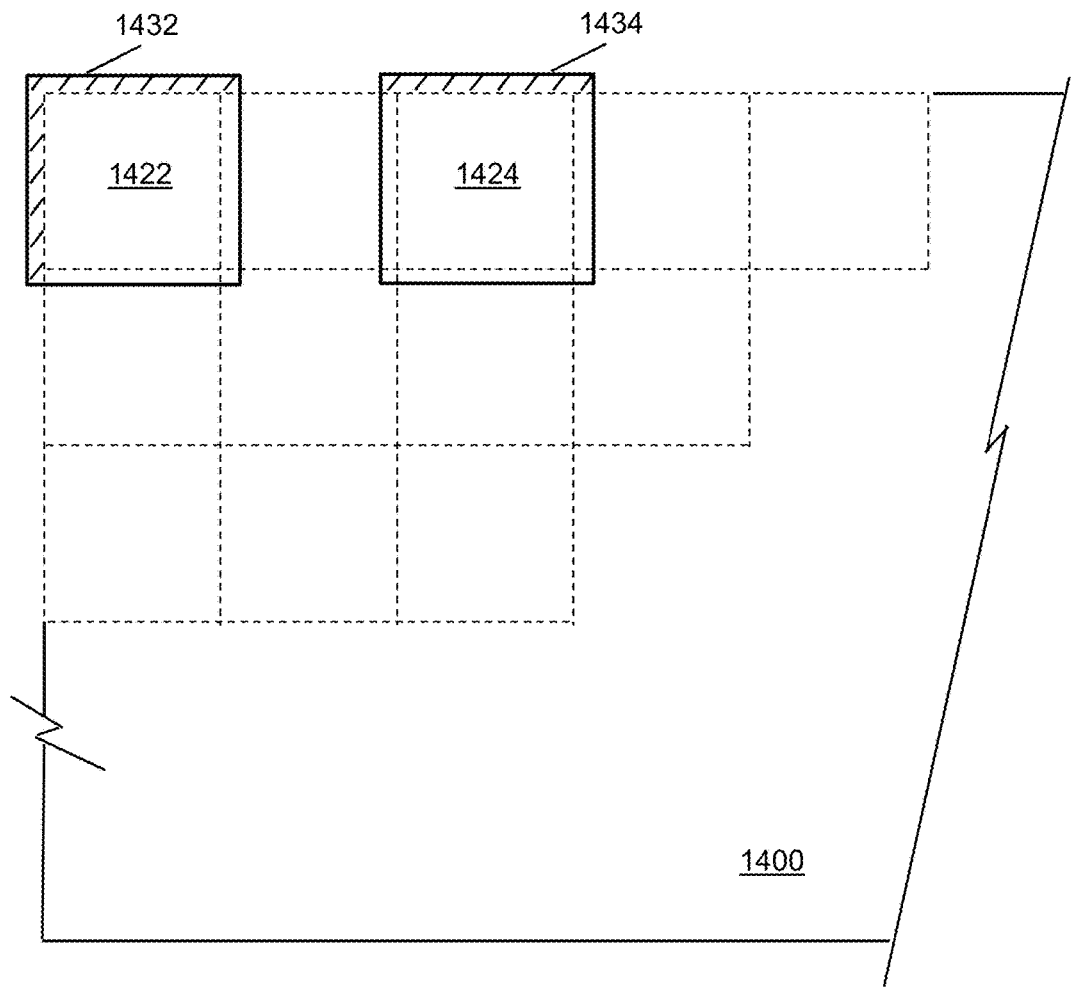

FIG. 14C shows two example Z-pixel by Z-pixel blocks 1422-1424 and respective associated (Z+2)-pixel by (Z+2)-pixel regions 1432-1434. These two example blocks 1422-1424 are located along the perimeter of the input image. The first example Z-pixel by Z-pixel block 1422 is located at top-left corner, therefore, the first example block 1422 has neighbors for two edges and one corner. Value "0"s are used for the two edges and three corners without neighbors (shown as shaded area) in the associated (Z+2)-pixel by (Z+2)-pixel region 1432 for forming imagery data. Similarly, the associated (Z+2)-pixel by (Z+2)-pixel region 1434 of the second example block 1424 requires "0"s be used for the top edge and two top corners. Other blocks along the perimeter of the input image are treated similarly. In other words, for the purpose to perform 3×3 convolutions at each pixel of the input image, a layer of zeros ("0"s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 15:
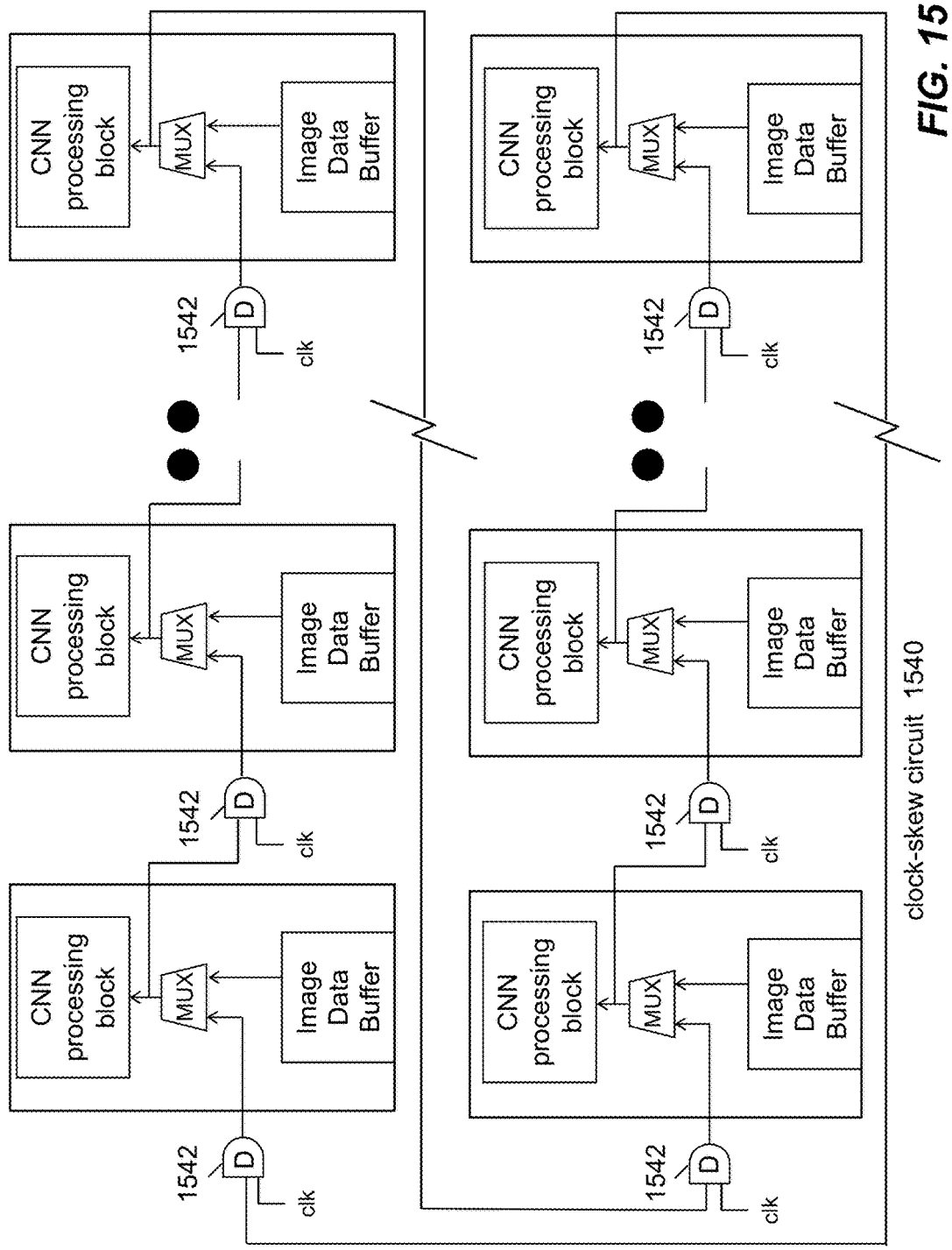
FIG. 15 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1540 for a group of example CNN processing engines are shown in FIG. 15.

CNN processing engines connected via the second example clock-skew circuit 1540 to form a loop. In other words, each CNN processing engine sends its own imagery data to a first neighbor and, at the same time, receives a second neighbor's imagery data. Clock-skew circuit 1540 can be achieved with well-known manners. For example, each CNN processing engine is connected with a D flip-flop 1542.

Figure 16:
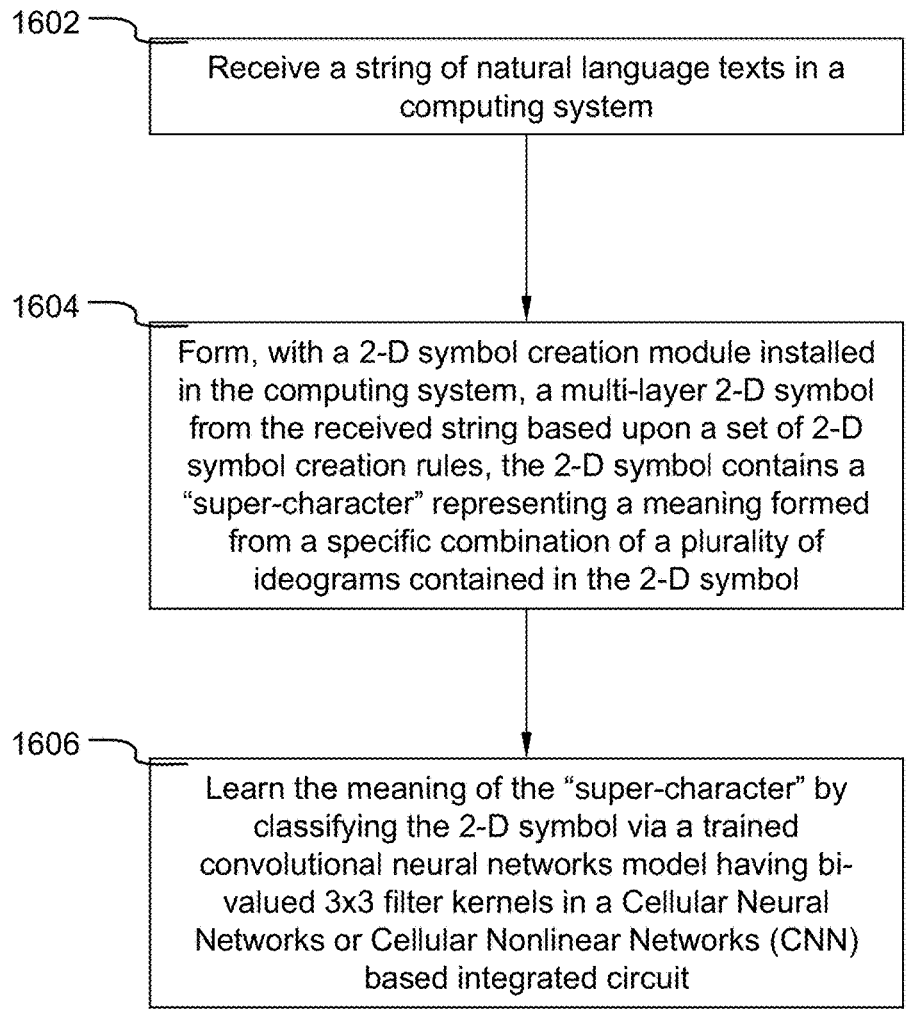
FIG. 16 is a flowchart illustrating an example process of natural language processing using a CNN based integrated circuit in accordance with an embodiment of the invention.

Referring now to FIG. 16, it is a flowchart illustrating an example process 1600 of natural language processing using a Cellular Neural Networks or Cellular Nonlinear Networks (CNN) based integrated circuit.

Process 1600 starts at action 1602 by receiving a string of written natural language texts in a computing system (e.g., a computer with multiple processing units). At action 1604, a multi-layer two-dimension (2-D) symbol is formed from the received string according to a set of 2-D symbol creation rules. The 2-D symbol contains a "super-character" representing a meaning formed from a specific combination of a plurality of ideograms contained in the 2-D symbol.

Details of an example multi-layer 2-D symbol 100 are described and shown in FIG. 1 and FIGS. 2A-2B. In order to accommodate a CNN based integrated circuit (e.g., example CNN based Integrated circuit 400 shown in FIGS. 4A-4B), each of the N×N pixel contains K-bit data, where K is a positive integer. In one embodiment, K is 5.

Figure 18:
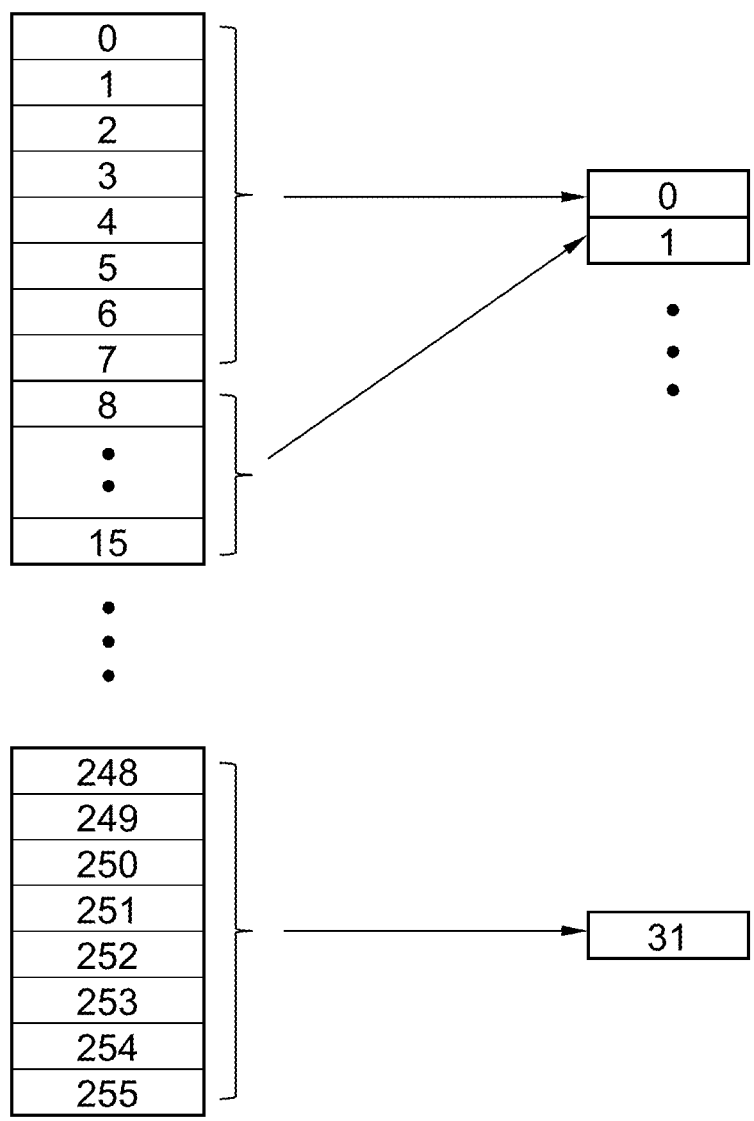
FIG. 18 is a diagram showing an example data conversion scheme.
Figure 19:
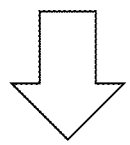
FIG. 19 is a diagram showing an example filter kernel conversion scheme in accordance with the invention.

FIG. 18 is a diagram showing an example data conversion scheme for converting an imagery data (e.g., 2-D symbol) from 8-bit [0-255] to 5-bit [0-31] per pixel. For example, bits 0-7 becomes 0, bits 8-15 becomes 1, etc.

Next, at action 1606, the meaning of the "super-character" is learned by classifying the 2-D symbol via a trained convolutional neural networks model having bi-valued 3×3 filter kernels in the CNN based integrated circuit.

Figure 17:
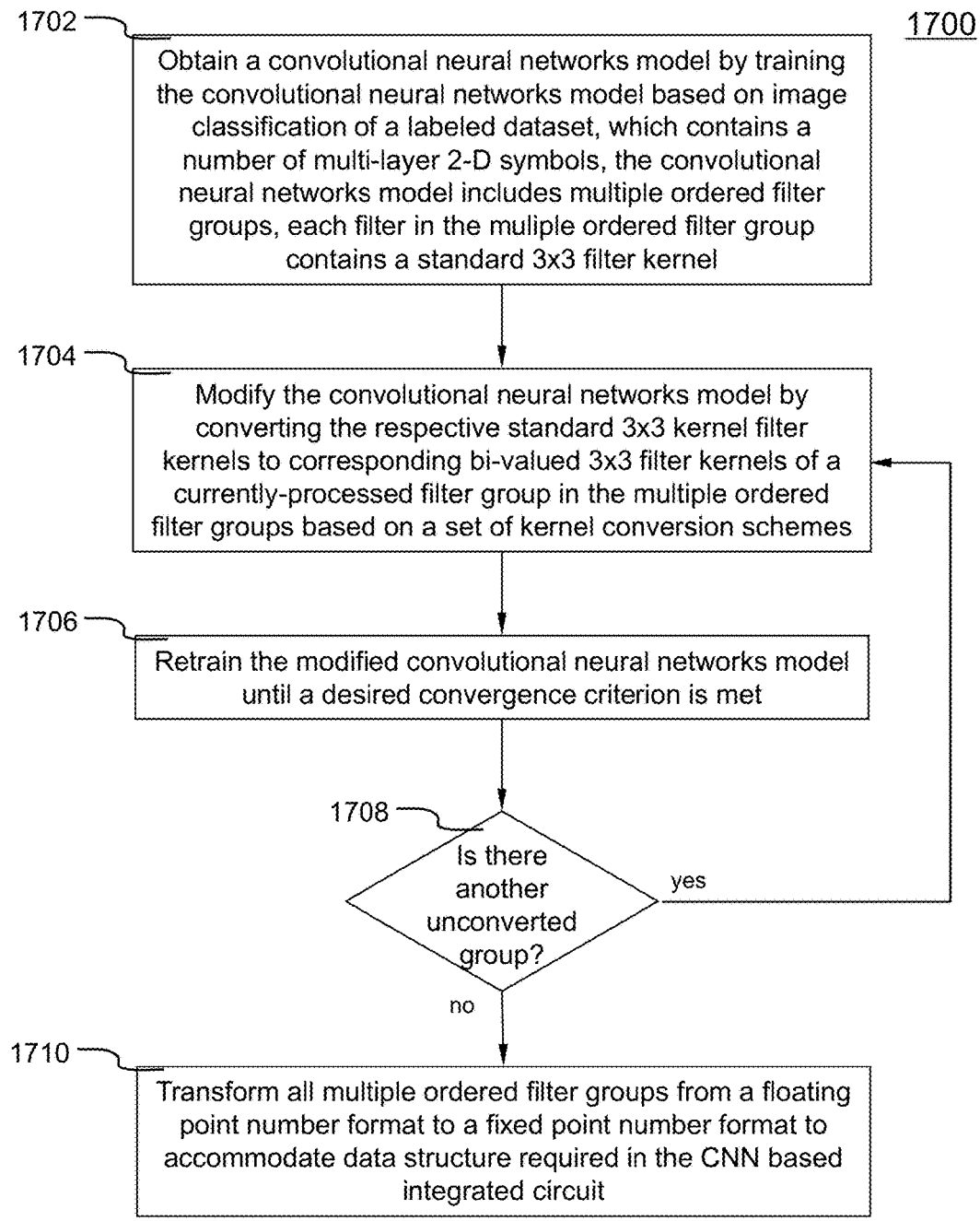
FIG. 17 is a flowchart illustrating an example process of achieving a trained convolutional neural networks model having bi-valued 3×3 filter kernels in accordance with an embodiment of the invention.

A trained convolutional neural networks model is achieved with an example set of operations 1700 shown in FIG. 17. At action 1702, a convolutional neural networks model is first obtained by training the convolutional neural networks model based on image classification of a labeled dataset, which contains a sufficiently large number of multi-layer 2-D symbols. For example, there are at least 4,000 2-D symbols for each category. In other words, each 2-D symbol in the labeled dataset is associated with a category to be classified. The convolutional neural networks model includes multiple ordered filter groups (e.g., each filter group corresponds to a convolutional layer in the convolutional neural networks model). Each filter in the multiple ordered filter groups contains a standard 3×3 filter kernel (i.e., nine coefficients in floating point number format (e.g., standard 3×3 filter kernel 1810 in FIG. 19)). Each of the nine coefficients can be any negative or positive real number (i.e., a number with fraction). The initial convolutional neural networks model may be obtained from many different frameworks including, but not limited to, Mxnet, caffe, tensorflow, etc.

Then, at action 1704, the convolutional neural networks model is modified by converting respective standard 3×3 filter kernels 1810 to corresponding bi-valued 3×3 filter kernels 1820 of a currently-processed filter group in the multiple ordered filter groups based on a set of kernel conversion schemes. In one embodiment, each of the nine coefficients C(i,j) in the corresponding bi-valued 3×3 filter kernel 1820 is assigned a value 'A' which equals to the average of absolute coefficient values multiplied by the sign of corresponding coefficients in the standard 3×3 filter kernel 1810 shown in following formula:

$$A = \sum_{1 \le i,j \le 3} |C(i, j)|/9 \quad (2)$$

Filter groups are converted one at a time in the order defined in the multiple ordered filter groups. In certain situation, two consecutive filter groups are optionally combined such that the training of the convolutional neural networks model is more efficient.

Next, at action 1706, the modified convolutional neural networks model is retrained until a desired convergence criterion is met or achieved. There are a number of well known convergence criteria including, but not limited to, completing a predefined number of retraining operation, converging of accuracy loss due to filter kernel conversion, etc. In one embodiment, all filter groups including those already converted in previous retraining operations can be changed or altered for fine tuning. In another embodiment, the already converted filter groups are frozen or unaltered during the retraining operation of the currently-processed filter group.

Process 1700 moves to decision 1708, it is determined whether there is another unconverted filter group. If 'yes', process 1700 moves back to repeat actions 1704-1706 until all filter groups have been converted. Decision 1708 becomes 'no' thereafter. At action 1710, coefficients of bi-valued 3×3 filter kernels in all filter groups are transformed from a floating point number format to a fixed point number format to accommodate the data structure required in the CNN based integrated circuit. Furthermore, the fixed point number is implemented as reconfigurable circuits in the CNN based integrated circuit. In one embodiment, the coefficients are implemented using 12-bit fixed point number format.

Figure 20A:
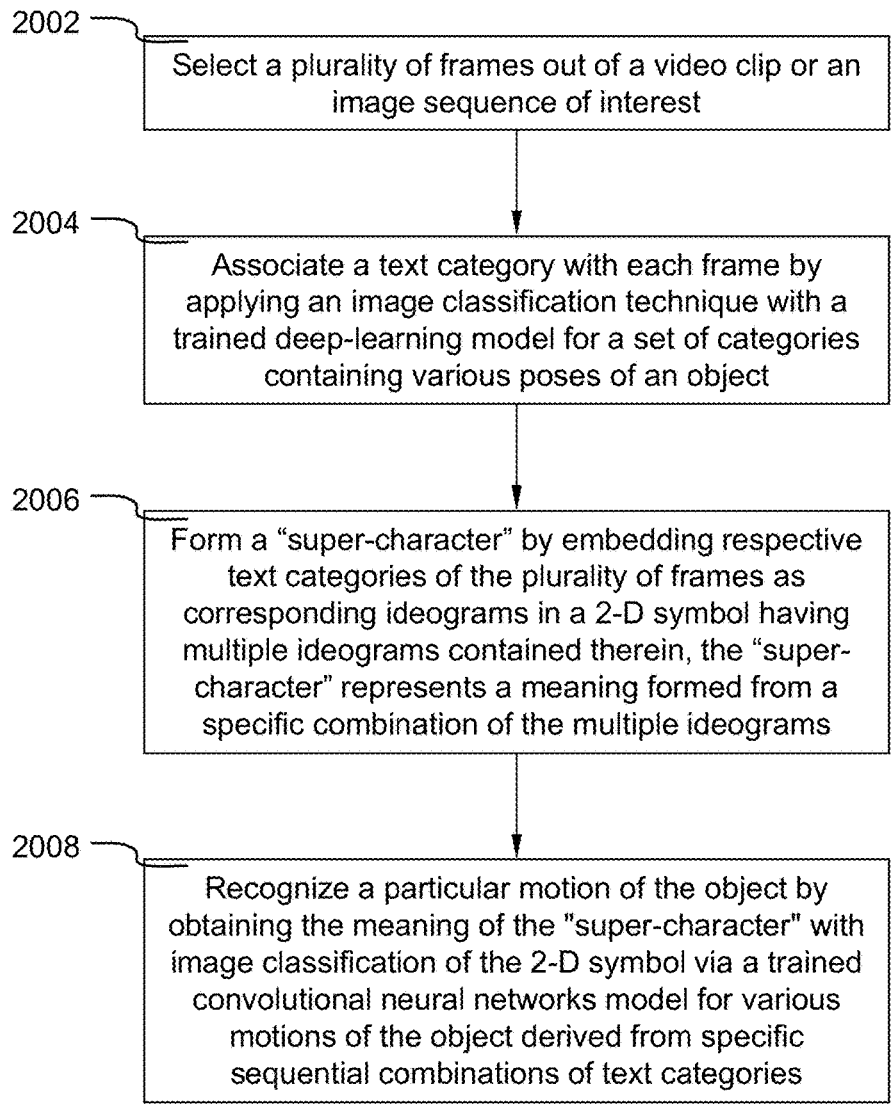
FIGS. 20A-20C are flowcharts illustrating three example processes of recognizing motions of an object of interest via a "super-character" according to embodiments of the invention.

Referring now to FIG. 20A, it is shown a flowchart illustrating a first example process 2000 of recognizing motions of an object in a video clip or an image sequence according to an embodiment of the invention. Motions of an object may include, but are not limited to, movements, gestures, gaits, etc.

Figure 21:
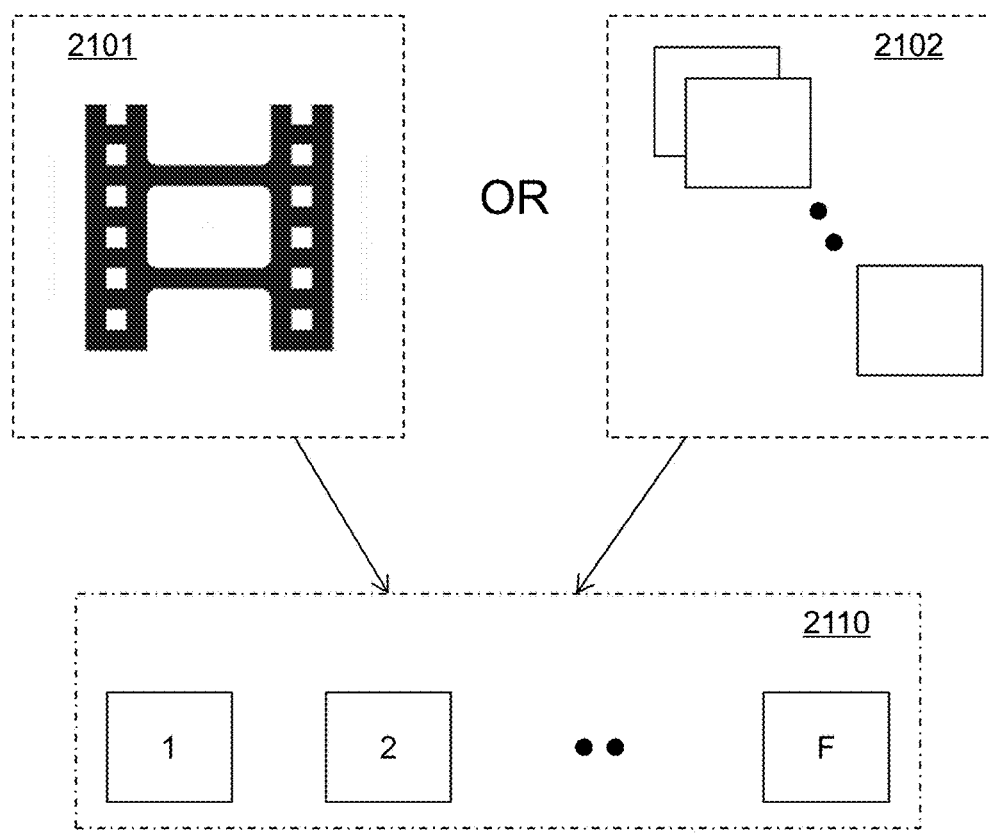
FIG. 21 is a diagram showing example selection of a plurality of frames for motion recognitions of an object of interest in accordance with an embodiment of the invention.

Process 2000 starts by selecting a plurality of frames out of a video clip or an image sequence of interest at action 2002. FIG. 21 is a schematic diagram showing F frames 2110 are chosen from a video clip 2101 (e.g., a portion of film or movie or video) or an image sequence in time 2102. F is an integer at least two. When image sequence in time 2102 contains less than equal to F frames, the entire image sequence can be selected. If there are more than F frames, then a down sampling technique may be used for choosing F frames.

Figure 22A:
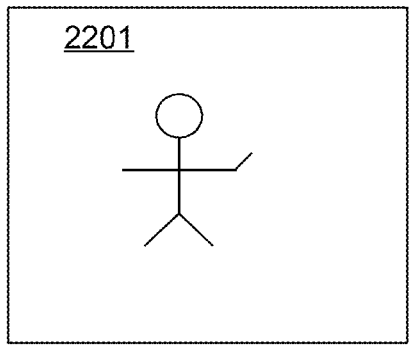
FIG. 22A is a diagram showing example text categories associated with the frames by image classification technique in accordance with an embodiment of the invention.
Figure 22A:
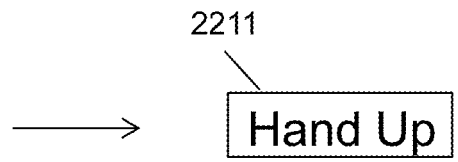
Figure 22A:
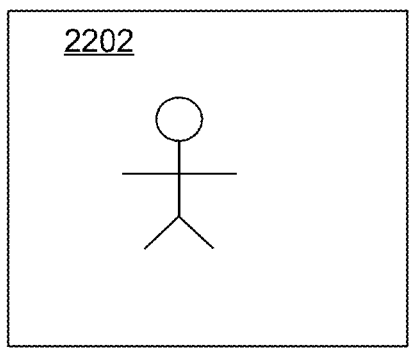
Figure 22A:
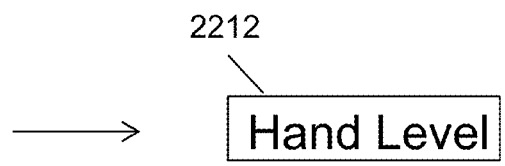
Figure 22A:
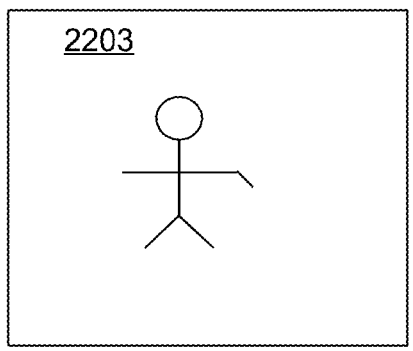
Figure 22A:
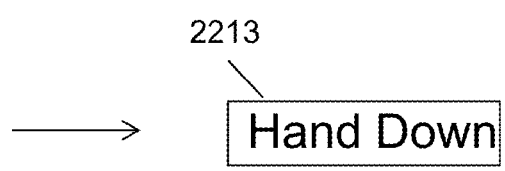
Figure 22B:
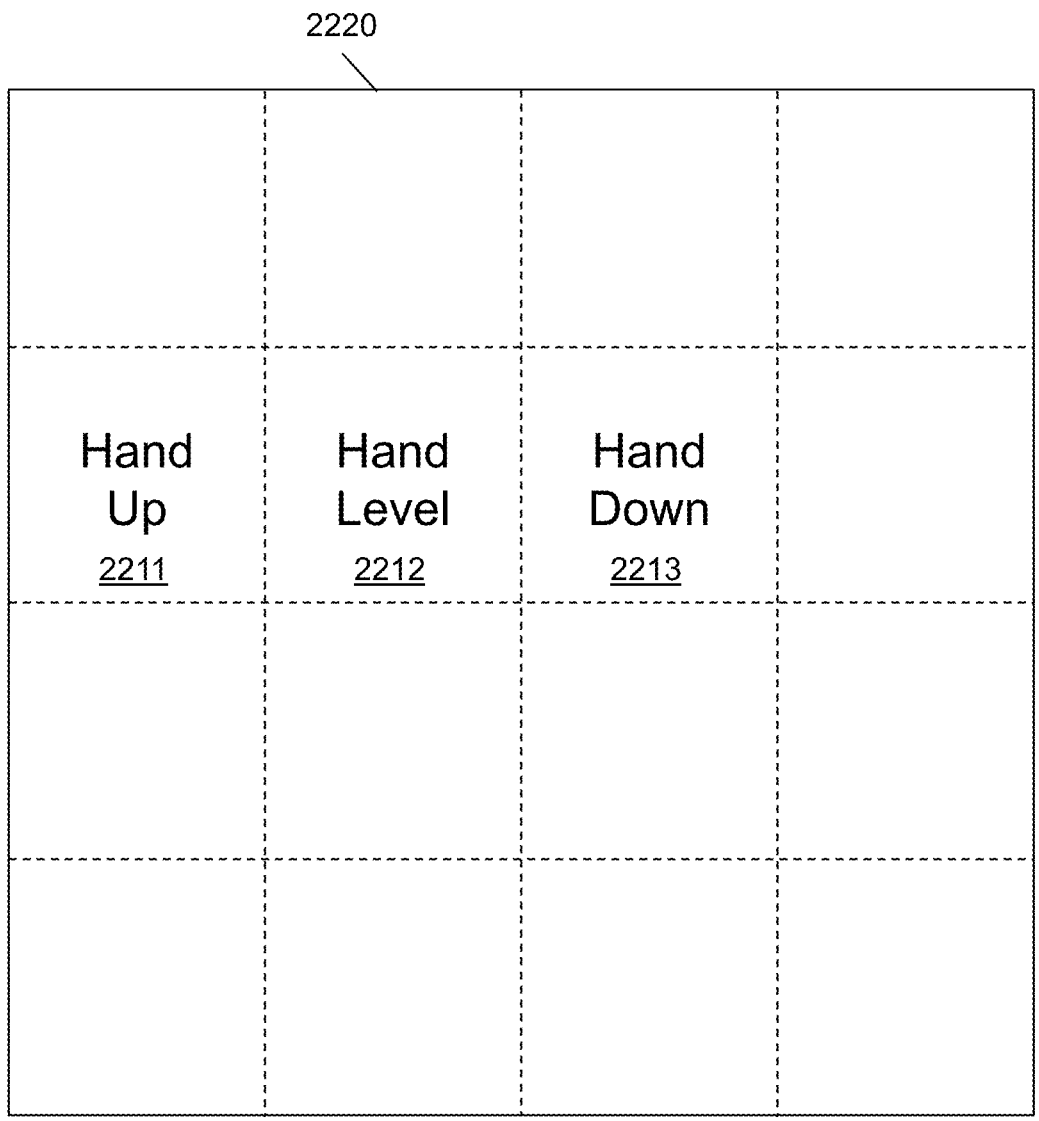
FIG. 22B is a diagram showing an example "super-character" created from respective text categories of the plurality of frames as corresponding ideograms in accordance with an embodiment of the invention.

Next at action 2004, a text category is associated with each of the selected frames by applying image classification technique with a trained deep-learning model for a set of categories containing various poses of an object of interest. This can be performed in a multiple-processor computing system. The object of interest can be many different things, for example, animal, animal body part, vehicle, etc. Poses of a person (i.e., object) may include, but are not limited to, standing, squatting, sitting, specific hand gesture, smiling, crying, eye blinking, etc. Once imagery data is associated with a text category, motions of an object can be derived from a specific sequential combination of text categories. FIG. 22A is a schematic diagram showing three different hand gestures 2201-2203 associated with respective text categories of hand up 2211, hand level 2212 and hand down 2213.

Next, at action 2006, a "super-character" is formed by embedding respective text categories of the plurality of frames as corresponding ideograms. "Super-character" is a 2-D symbol having multiple ideograms contained therein as shown in FIGS. 2A and 3A-3E. "Super-character" can be used for natural language processing (NLP) as shown and described in FIGS. 5A-5B and 6A-6C. In one embodiment, the "super-character" is used for understanding the meaning of a sentence comprising of a series or string of words/terminologies. With imagery data represented by respective text categories embedded in a "super-character", the meaning (e.g., a particular motion of an object) can be understood with substantially similar technique in NLP.

Finally, at action 2008, a particular motion of the object of interest is recognized by obtaining the meaning of the "super-character" with image classification via a trained convolutional neural networks model for various motions of the object derived from a specific sequential combination of respective text categories. For example, three hand gestures 2201-2203 shown in FIG. 22A represent hand waving of a person. An example "super-character" 2220 contains three text categories 2211-2213 of hand gestures. For illustration simplicity and clarity, only three text categories are shown in certain locations of the example "super-character" 2220. The invention does not limit to specific locations and number of ideograms in a "super-character".

Convolutional neural network model can be implemented in a semi-conductor chip as shown in FIGS. 4A-15.

Figure 20B:
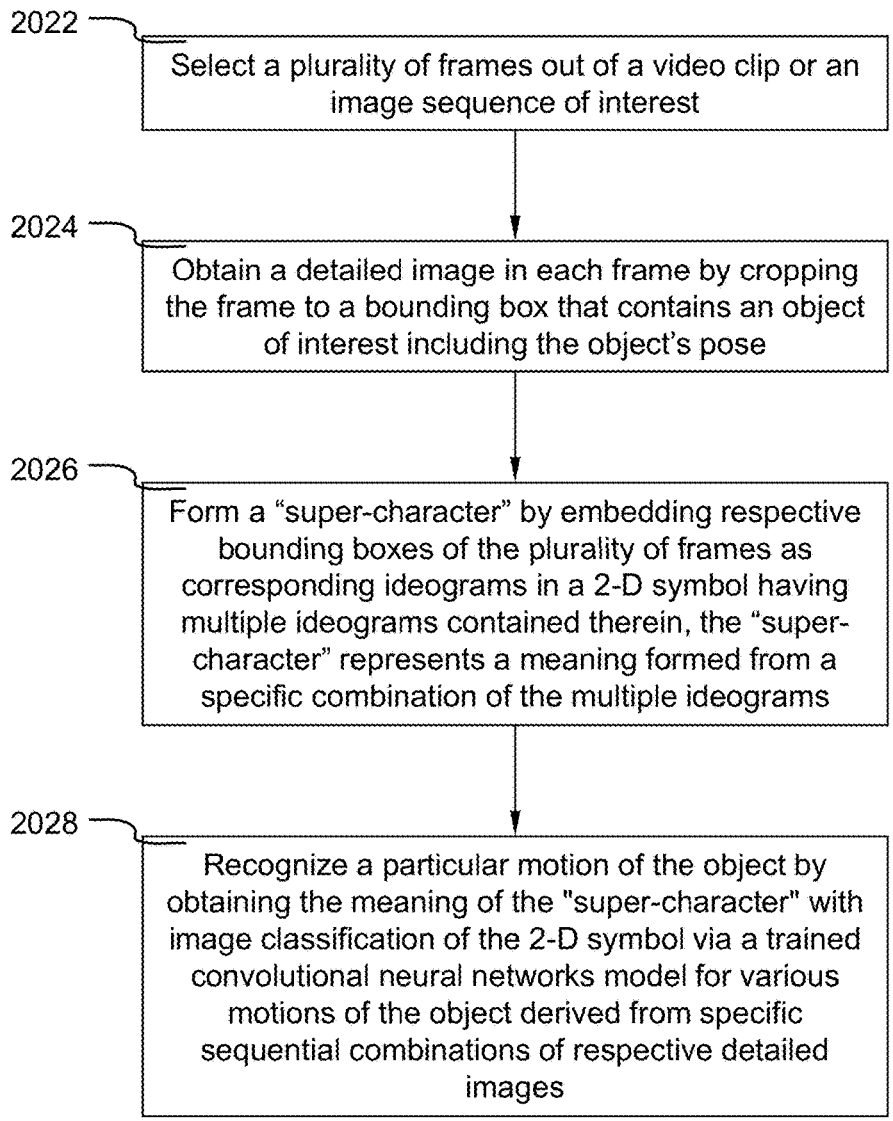

In another embodiment, a second example process 2020 of recognizing motions of an object is shown in FIG. 20B. Process 2020 starts by selecting a plurality of frames out of a video clip or an image sequence in time at action 2022. Next, at action 2024, a detailed image in each frame is obtained by cropping the frame to a bounding box that contains the object of interest including the object's pose. In the second embodiment, the goal is to ensure an enlarged image from each frame is used for motion recognition. Then, at action 2026, a "super-character" is formed by embedding respective bounding boxes of the plurality of frames as corresponding ideograms. Instead of text categories, detailed images are used as ideograms in the second embodiment.

Finally, at action 2028, a particular motion of the object of interest is recognized by obtaining the meaning of the "super-character" with image classification via a trained convolutional neural networks model for various motions of the object derived from a specific sequential combination of respective detailed images.

Figure 23A:
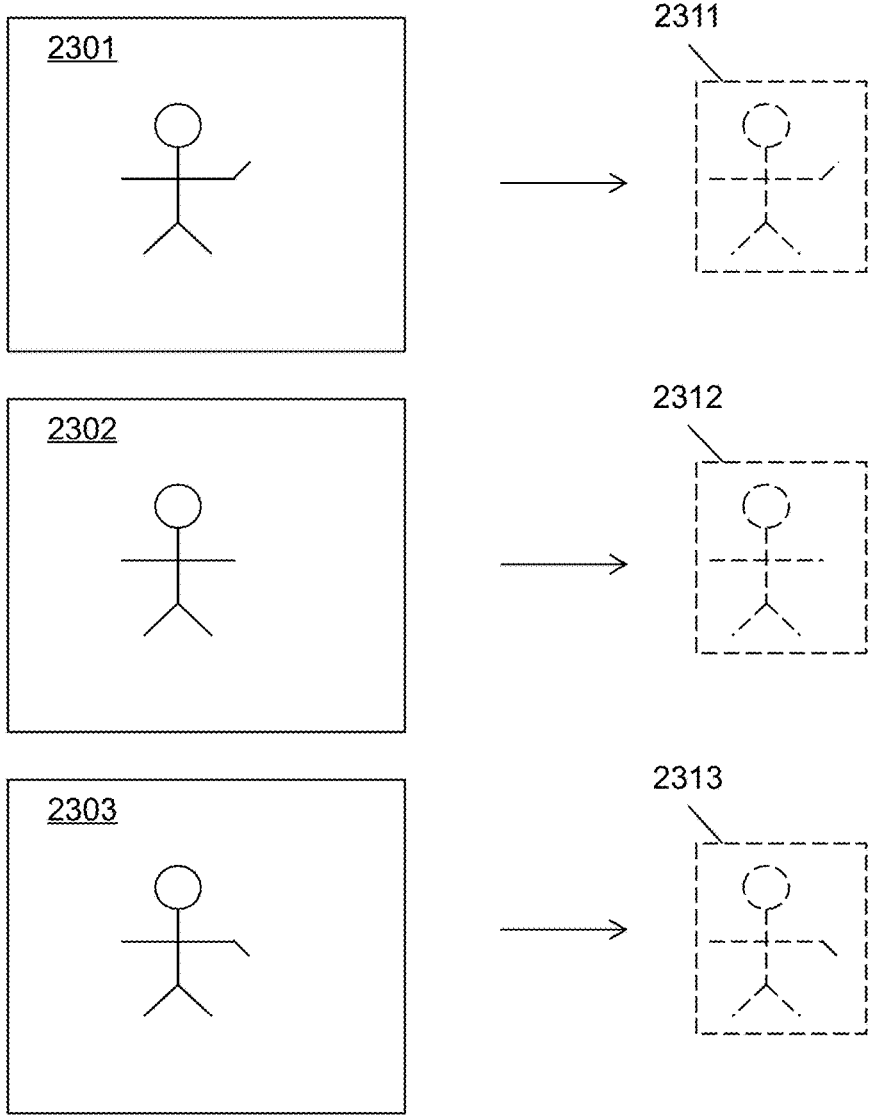
FIG. 23A is a diagram showing example detailed images obtained by cropping each frame to a corresponding bounding box in accordance with an embodiment of the invention.
Figure 23B:
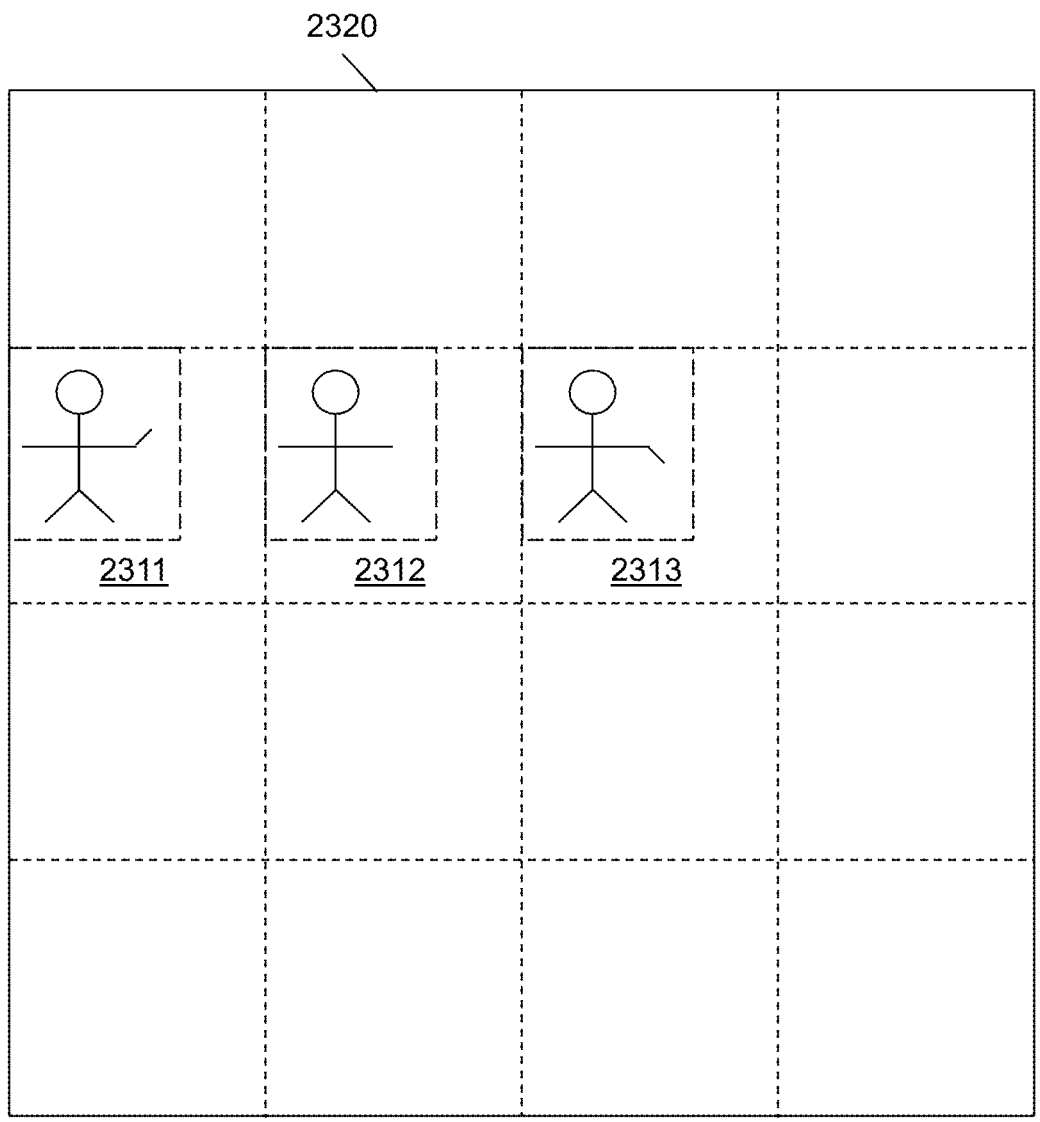
FIG. 23B is a diagram showing an example "super-character" created from respective bounding boxes of the plurality of frames as corresponding ideograms in accordance with an embodiment of the invention.

FIG. 23A is a diagram showing example detailed images in bounding boxes 2311-2313 of three frames 2301-2303 that contains three different hand gestures. A resulting "super-character" 2320 formed from three bounding boxes 2311-2313 is shown in FIG. 23B.

Figure 20C:
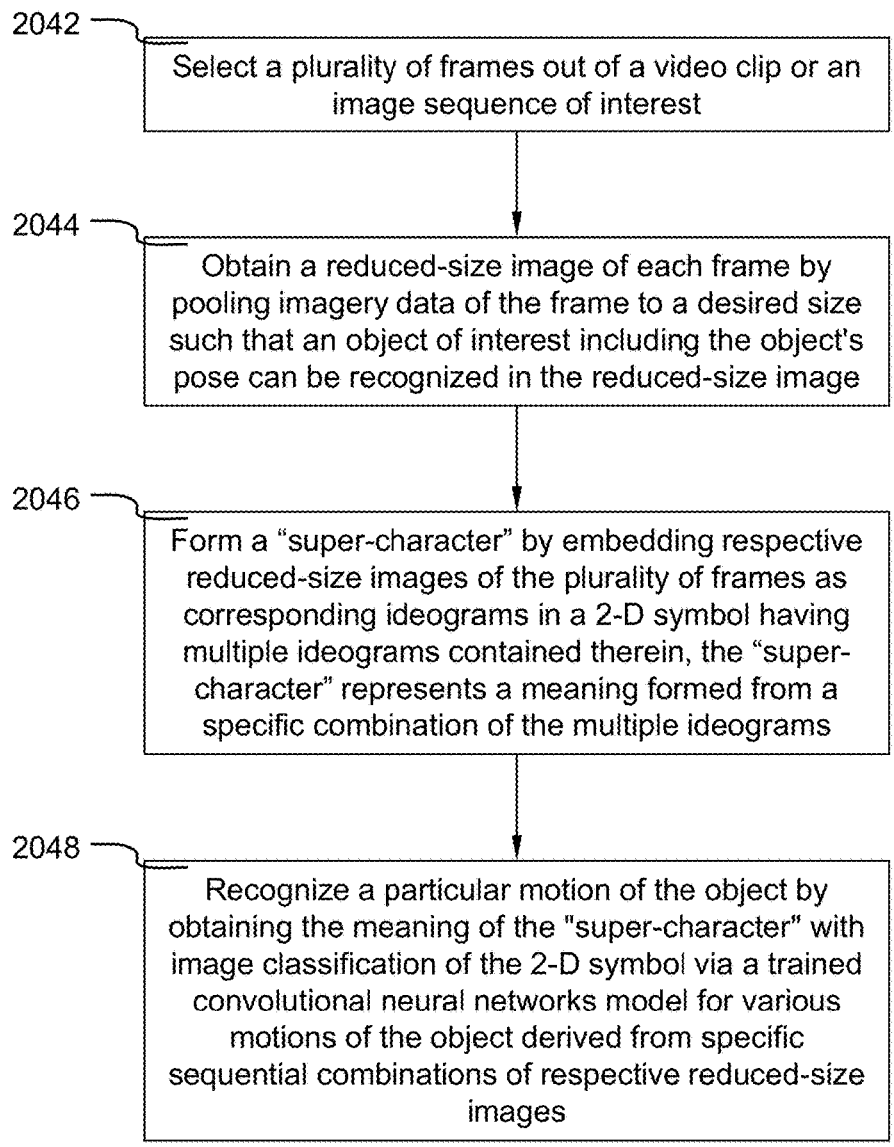

In yet another embodiment, a third example process 2040 of recognizing motions of an object is shown in FIG. 20C. Process 2040 starts by selecting a plurality of frames out of a video clip or an image sequence in time at action 2042. At action 2044, a reduced-size image of each frame is obtained. This can be achieved by pooling imagery data of the frame to a desired size such that the object of interest including the object's pose can still be recognized. Pooling can be performed in a number of well-known techniques (e.g., maximum, average, etc.).

Next, at action 2046, a "super-character" is formed by embedding respective reduced-size images of the plurality of frames as corresponding ideograms. Instead of text categories, reduced-size images are used as ideograms in the third embodiment.

Finally, at action 2048, a particular motion of the object of interest is recognized by obtaining the meaning of the "super-character" with image classification via a trained convolutional neural networks model for various motions of the object derived from a specific sequential combination of respective reduced-size images.

Figure 24A:
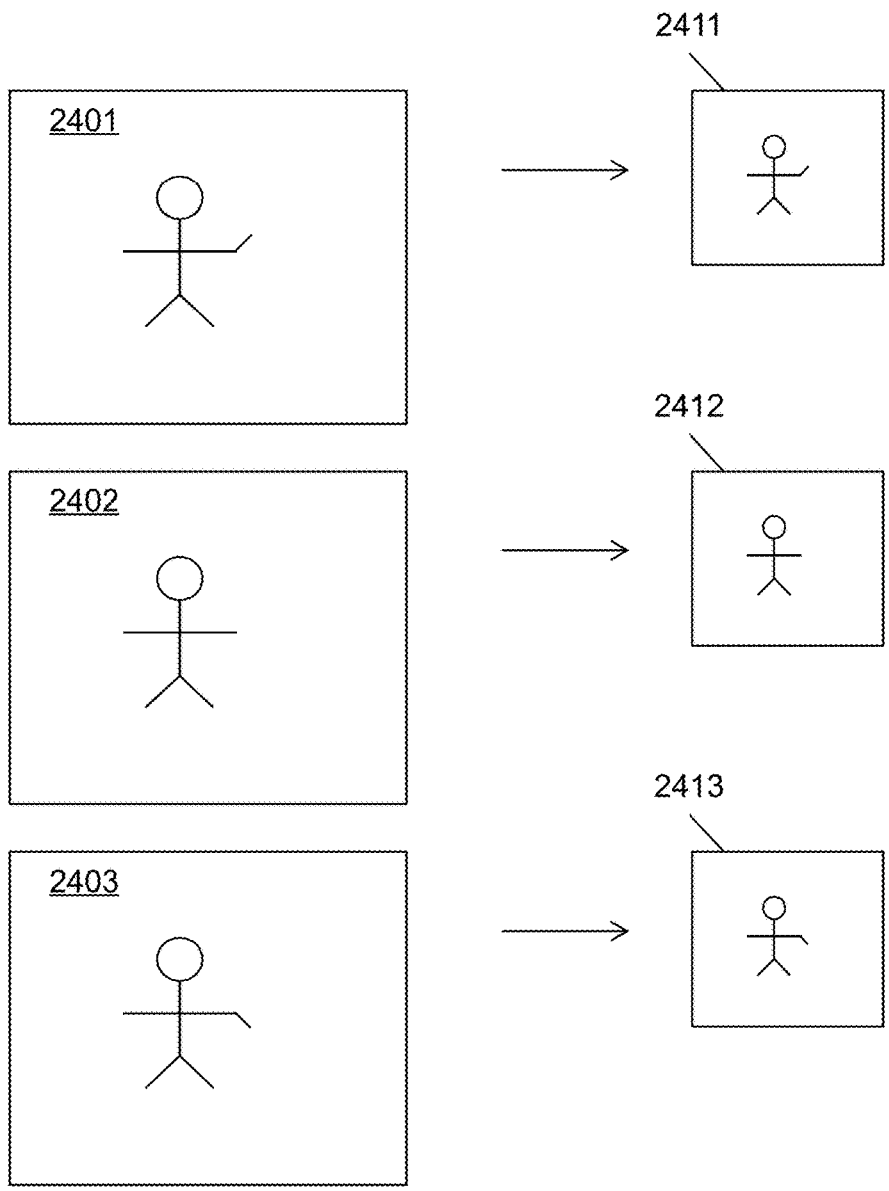
FIG. 24A is a diagram showing example reduce-sized images obtained by pooling imagery data of each frame in accordance with an embodiment of the invention.
Figure 24B:
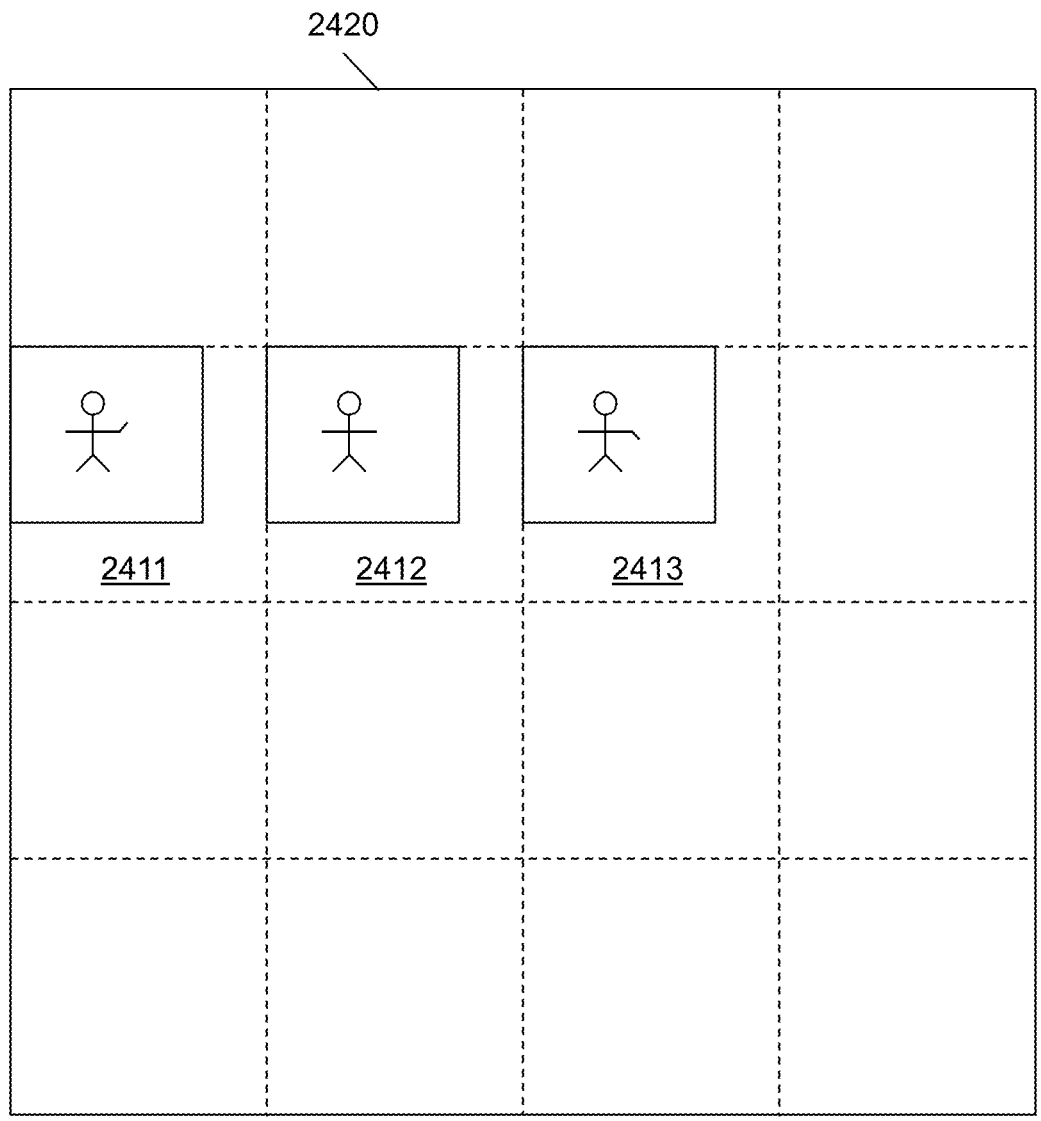
FIG. 24B is a diagram showing an example "super-character" created from respective reduced-size images of the plurality of frames as corresponding ideograms in accordance with an embodiment of the invention.

FIG. 24A is a diagram showing example reduced-size images 2411-2413 of three frames 2401-2403 that contains three different hand gestures. A resulting "super-character" 2420 formed from three reduced-size 2411-2413 is shown in FIG. 24B.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas three hand gestures have been described and shown as an object's pose, other poses may be used for demonstrating the invention, for example, open and close of an eye, movements of lips, motions of a vehicle. Additionally, whereas text categories are shown and described as English language categories, other natural languages may be used for achieving the same, for example, Chinese, Japanese, Korean or another written language. Moreover, whereas the two-dimensional symbol has been described and shown with a specific example of a matrix of 224×224 pixels, other sizes may be used for achieving substantially similar objections of the invention. Additionally, whereas two example partition schemes have been described and shown, other suitable partition scheme of dividing the two-dimensional symbol may be used for achieving substantially similar objections of the invention. Moreover, few example ideograms have been shown and described, other ideograms may be used for achieving substantially similar objectives of the invention. Furthermore, whereas Chinese, Japanese and Korean logosyllabic characters have been described and shown to be an ideogram, other logosyllabic characters can be represented, for example, Egyptian hieroglyphs, Cuneiform scripts, etc. Finally, whereas one type of bi-valued 3×3 filter kernel has been shown and described, other types may be used for accomplishing substantially similar objective of the invention. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A non-transitory storage medium storing instructions for execution by a processor for facilitating machine learning in a Cellular Neural Networks or Cellular Nonlinear Networks (CNN) based computing system using a stored two-dimensional symbol, the two-dimensional symbol comprising: a matrix of N×N pixels of data containing a super-character, the matrix being divided into M×M sub-matrices with each of the sub-matrices containing (N/M)×(N/M) pixels, where N and M are positive integers, and N is a multiple of M; and said each of the sub-matrices representing one ideogram defined in an ideogram collection set, and the super-character representing at least one meaning each formed with a specific combination of a plurality of ideograms; wherein the instructions include learning the meaning of the super-character within the two-dimensional symbol by classifying the two-dimensional symbol via a trained convolutional neural networks model in the CNN based computing system.

2. The non-transitory storage medium of claim 1, wherein the super-character is extracted out of the matrix in the CNN based computing system using an image processing technique.

3. The non-transitory storage medium of claim 2, wherein the image processing technique comprises a convolutional neural networks algorithm.

4. The non-transitory storage medium of claim 3, wherein the CNN based computing system comprises a semi-conductor chip containing digital circuits dedicated for performing the convolutional neural networks algorithm.

5. The non-transitory storage medium of claim 1, wherein the super-character comprises a minimum of two and a maximum of M×M ideograms.

6. The non-transitory storage medium of claim 1, wherein the ideogram collection set comprises pictograms, logosyllabic characters, punctuation marks, numerals and special characters defined by humans.

7. The non-transitory storage medium of claim 6, wherein the pictograms comprise icons.

8. The non-transitory storage medium of claim 6, wherein the pictograms comprise one or more Latin letters.

9. The non-transitory storage medium of claim 6, wherein the logosyllabic characters comprise Chinese characters.

10. The non-transitory storage medium of claim 6, wherein the logosyllabic characters comprise Japanese characters.

11. The non-transitory storage medium of claim 6, wherein the logosyllabic characters comprise Korean characters.

12. The non-transitory storage medium of claim 6, wherein the logosyllabic characters comprise Egyptian hierographs.

13. The non-transitory storage medium of claim 6, wherein the logosyllabic characters comprise Cuneiform scripts.

14. The non-transitory storage medium of claim 1, wherein each ideogram comprises at least one feature.

15. The non-transitory storage medium of claim 14, wherein the at least one feature comprises black and white, which is achieved with each of the N×N pixels to contain one-bit of the data.

16. The non-transitory storage medium of claim 14, wherein the at least one feature comprises grayscale shades, which is achieved each of the N×N pixels to contain more than one-bit of the data.

17. The non-transitory storage medium of claim 14, wherein the at least one feature comprises different colors, which is achieved with three respective basic color layers of said each ideogram and, with each of the N×N pixels to contain K-bit of the data, where K is a positive integer.

18. The non-transitory storage medium of claim 14, wherein the at least one feature comprises a dictionary-like definition, which is achieved using three related layers of said each ideogram with the first layer showing logosyllabic Chinese character, the second layer showing Chinese pinyin for pronunciation and the third layer showing a meaning in English.

* * * * *